(12) United States Patent
Hayes et al.

(10) Patent No.: US 8,572,697 B2
(45) Date of Patent: Oct. 29, 2013

(54) METHOD FOR STATISTICAL OBJECT IDENTIFICATION

(75) Inventors: John W. Hayes, Reno, NV (US); Christopher Luis Hamlin, Los Gatos, CA (US)

(73) Assignee: BlackRidge Technology Holdings, Inc., Reno, NV (US)

( * ) Notice: Subject to any disclaimer, the term of this patent is extended or adjusted under 35 U.S.C. 154(b) by 7 days.

(21) Appl. No.: 13/373,586

(22) Filed: Nov. 18, 2011

(65) Prior Publication Data

US 2013/0133039 A1   May 23, 2013

(51) Int. Cl.
*G06F 7/04* (2006.01)

(52) U.S. Cl.
USPC .......................................................... 726/4

(58) Field of Classification Search
USPC .......................................................... 726/4
See application file for complete search history.

(56) References Cited

U.S. PATENT DOCUMENTS

| | | | |
|---|---|---|---|
| 2002/0178410 A1* | 11/2002 | Haitsma et al. | 714/709 |
| 2003/0014365 A1* | 1/2003 | Inada et al. | 705/50 |
| 2004/0221158 A1* | 11/2004 | Olkin et al. | 713/170 |
| 2005/0044417 A1* | 2/2005 | Carpentier et al. | 713/201 |

\* cited by examiner

*Primary Examiner* — Cordelia Zecher

(74) *Attorney, Agent, or Firm* — Thomas N. Giaccherini

(57) ABSTRACT

The present invention provides a mechanism to communicate an original object (12S) without requiring the sending of the complete original object. A representative of the original object (12S), a statistical object (14S), is generated by one entity and is communicated to a second entity. The second entity receives the statistical object (14S), and identifies it as being generated from an original object (12S). If the second entity is unable to unambiguously identify the statistical object (14S), the second entity records the partial identity progress and associated communications characteristics information (22). The amount of information communicated during this process is much smaller than the original object (12S), greatly improving the speed and efficiency of communicating an original object (12S).

43 Claims, 24 Drawing Sheets

Remote System has a copy of each Certificate that is expected to be used

The Solution:
Create a representation of each Certificate, called a Cryptographic Hash, which is only 32 bits long, and send to the Remote System Ben needs to communicate with the Remote System Remote System receives Ben's communication Statistical Object Matcher Original Object Identifier

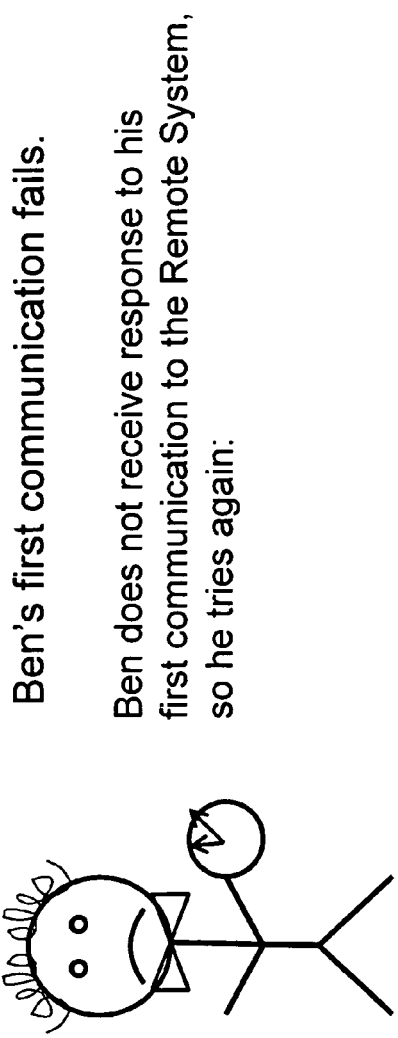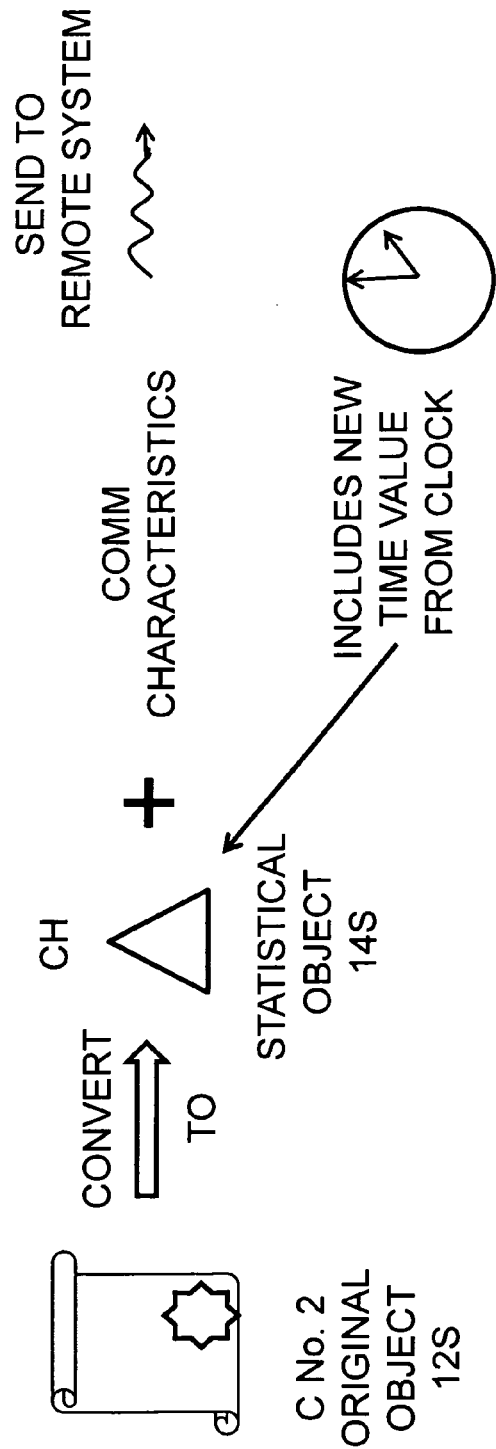
Figure 17
Ben's first communication fails.
Ben does not receive response to his first communication to the Remote System, so he tries again:

Ben sends a second communication:

A match is found:

Greg & Sally are discarded!

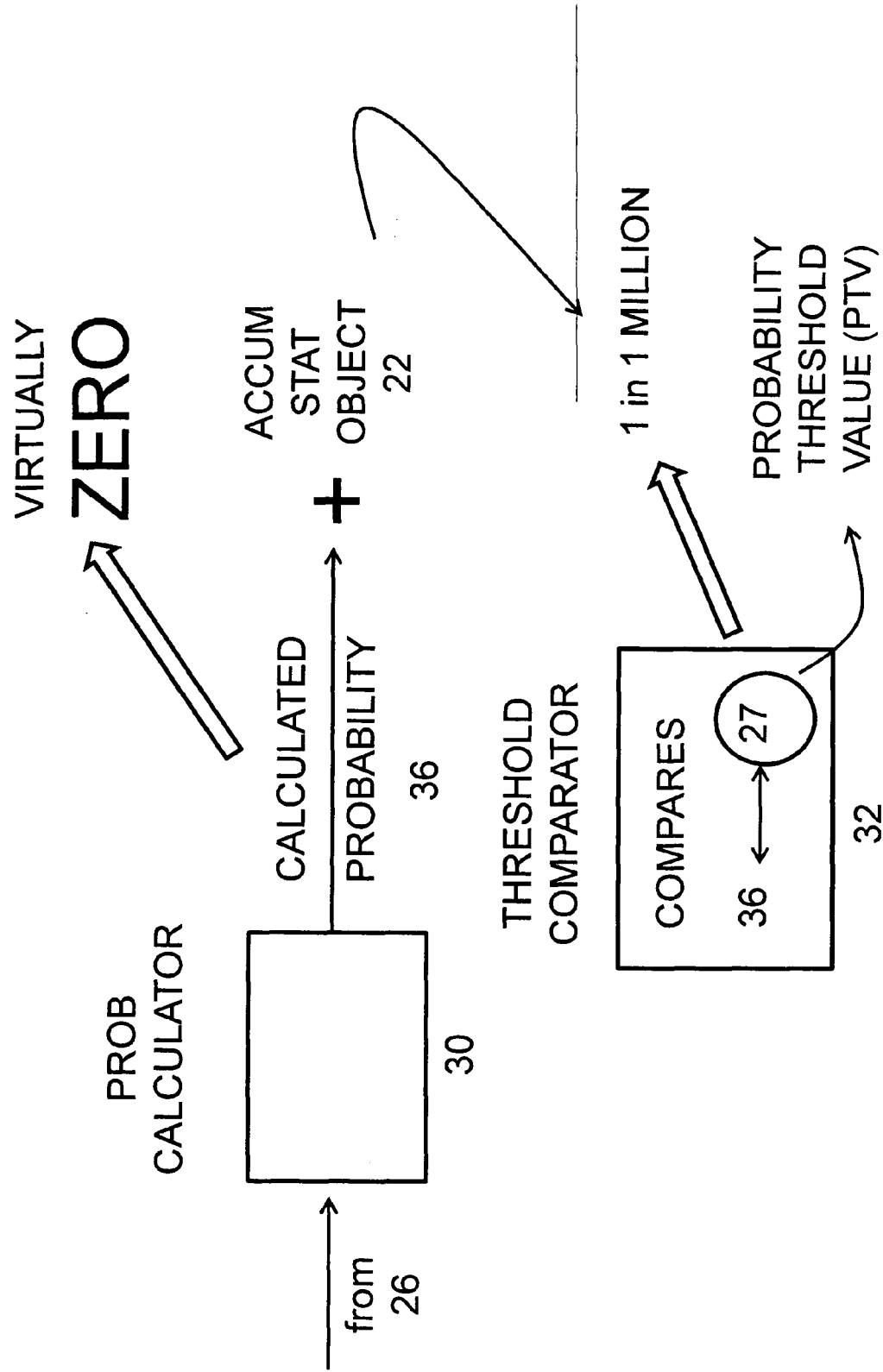

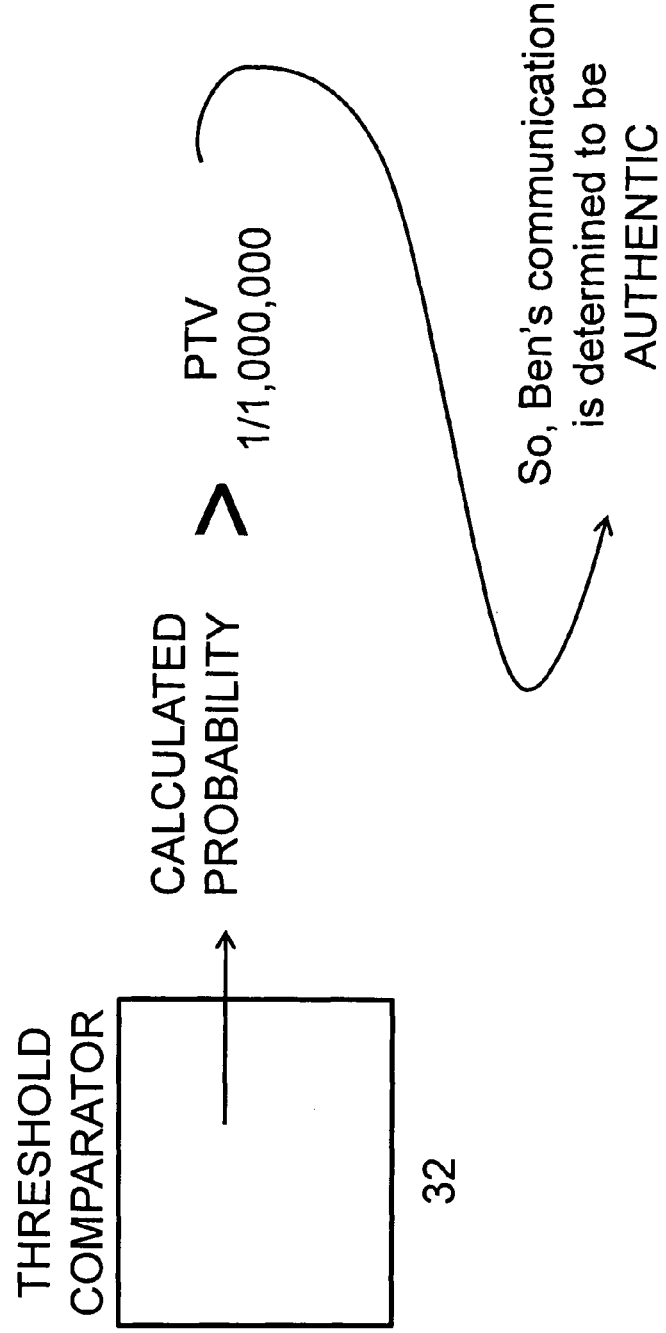

METHOD FOR STATISTICAL OBJECT IDENTIFICATION

FIELD OF THE INVENTION

The present invention pertains to methods for uniquely identifying an original object from a series of statistical objects by receiving and identifying the original object from which the statistical objects were generated.

BACKGROUND OF THE INVENTION

Statistical objects are used where conventional secured communications of an original object cannot be used due to protocol constraints or communications bandwidth limitations. Using a statistical object instead of an original object achieves much greater bandwidth efficiency due to the use of a deterministic statistical representation of the original object.

In this Specification, and in the Claims that follow, the term "statistical object" is a string of values mapped by a random or "hash" function. The output of this function points to a string of values which stands for or represents the input to the function. In FIG. 1, the output string of values is shown as $x_1$, $x_2$, $x_3$ ... $x_n$. In this example, the input of the function is an original object, while the output is a statistical object.

If the string is shorter than the input, a "collision" occurs. A collision results when two or more different inputs produce the same output, and is generally considered detrimental.

To mitigate the effects of collisions, additional inputs are added to the function. These inputs vary over time, enabling different streams of statistical object to eventually diverge from their colliding tendencies. As an example, a clock may be employed to add a time value as an input. As an alternative, a counter may serve as an input. Multiple additional inputs may be used together in the generation of the statistical object.

In this Specification, and in the Claims that follow, the terms "function," "random function" and "hash function" are intended to encompass any procedure or mathematical method that converts are large amount of data into a smaller amount of data. In one embodiment of the invention, the output may be a single integer or value which serves as an index to an array or database. According to Wikipedia, the output values of a hash function may be called hash values, hash codes, hash sums, checksums or hashes. The inputs to a hash function may be referred to as keys.

FIG. 2 illustrates a simple example of the operation of a hash function. A set of four inputs or keys are shown as the names Joe, Moe, Sam and Charlie. The hash function $\mathcal{F}(x)$ associates a hash or output with each name. The input of Joe causes the hash function to point to output "03". The input of Moe causes the hash function to point to the output of "01". The input of Sam causes the hash function to point to the output of "06". The input of Charlie causes the hash function to point to the output of "03". Because the Joe and Charlie inputs both return a has of "03", this pair of hashes is said to cause a collision.

As noted above, this collision may be avoided by adding a clock or a counter as an additional input to the hash function. So, in an alternative embodiment, if the input of Joe is provided to the hash function at 1:00 p.m., and the input of Charlie is provided to the hash function at 2:00 p.m., the different inputs would lessen the probability that this collision would occur.

One advantage of using statistical objects is that information may be "concentrated" in a relatively fewer number of transmitted bits, which increases the efficiency of communication across a network.

The consequence of using a deterministic statistical representation is that the representation is not guaranteed to identify uniquely to the source original object. The deterministic statistical representation, the statistical object, may be generally considered to be the output of a hash or similar function of the original object along with one or more varying deterministic inputs such as a clock or counter. These varying deterministic inputs are necessary so that the cumulative stream of output statistical objects generated from a single original object is generally unique across a large number generated statistical objects. Unambiguously identifying a statistical object to a unique original object is essentially an exercise in mitigating the effects of the birthday problem. The birthday problem is the probability that output of the hash of different original objects and their respective deterministic inputs produce identical statistical objects. The generation of a single statistical object by two or more original objects causes a collision.

FIG. 3 supplies a graph that illustrates the birthday problem. The number of individuals in any given group is shown on the x-axis. The y-axis shows an approximate probability, on a scale from zero to one, that two people in the group with share the same birthday. As an example, in a group of twenty-three people, the probability that two persons in this group will have the same birthday is about fifty percent.

The birthday problem may be understood as an example of the hash function depicted in FIG. 2. In the birthday problem, the keys or inputs are the names of the individuals in the group. The hash function maps these inputs to one of the hashes or outputs, which represent the days of the year. If two persons in the group share the same birthday, the hash function points to the same day for two different individuals, and a collision occurs.

Given a uniform distribution, the probability of a collision increases with the number of statistical objects in use. A mechanism to unambiguously identify statistical objects back to their original objects would constitute a major technological advance, and would satisfy long felt needs and aspirations in the cyber security industry.

SUMMARY OF THE INVENTION

A statistical object, the deterministic statistical representation of an original object, may be generally considered to be the output of a hash or similar function coupled with additional inputs of clocks, counters and other varying deterministic inputs. Unambiguously identifying a statistical object to a unique original object is essentially an exercise in mitigating the effects of the birthday problem. The birthday problem is the probability that output of the hash of different original objects and their deterministic inputs produce identical statistical objects. The generation of a single statistical object by two or more original objects causes a collision. Given a uniform distribution, the probability of a collision increases with the number of statistical objects in use. Statistical objects are designed to be used as components of security devices. As a component to security devices, in additional to uniquely identifying a statistical object back to the original object, the overall probability of guessing any valid statistical object must also be considered. The amount of space available to carry a statistical object will vary with the communications mechanism, but the size of an individual statistical object is expected to remain small, generally less than the number of bits required to uniquely identify an original object when large numbers of objects are in use. This requires the aggregation of two or more related statistical objects into a larger aggregate statistical object. Aggregating multiple related statistical objects into a single aggregate statistical object requires that all possible original object resolution matches are tracked and maintained. Multiple statistical objects from the same original object can be associated together by using information associated with the communication and reception of the statistical objects. This information, called communications characteristics, can include networking information, such as the source address or network session information including source and destination addresses and source and destination port numbers. Communications characteristics can also include physical information such as the physical port upon which the statistical object was received or the logical channel upon which the statistical object was received.

To unambiguously identify the original object from which a statistical object or a stream of statistical objects was generated, the device performing the identity must maintain a table of all valid statistical objects. This table may contain collisions where multiple original objects generate the same statistical object. When a statistical object is received, it is first looked up in the table of all statistical objects to determine if the received statistical object is valid. If the received statistical object is not found in the table, then no further processing occurs with respect to identifying the original object on that reception. When a statistical object is received and is matched in the table of all valid statistical objects, the communications characteristics associated with the reception of the statistical object and the list of all potential original objects are recorded. If the list of potential original objects has exactly a single entry, then the original object is identified and the process moves on to calculating the statistical probability.

When a statistical object is received and is not unambiguously identified, the partially identified statistical object and the list of potential original objects are recorded along with the communications characteristics associated with the reception of the statistical object. When a another statistical object with related communications characteristics is received, the list of potential original objects is pruned of original objects that cannot generate the complete set of received statistical objects found in the aggregate statistical object. Once the original object is unambiguously identified, the process moves on to calculating the statistical probability of guessing the information in the aggregate statistical object. If the original object is not unambiguously identified, nothing further is done at this time and the system awaits the reception of another statistical object with related communications characteristics to increase the number of bits of information received and again aggregates this information into the aggregate statistical object and the process repeats itself.

Calculating the probability of guessing the information in the aggregate statistical object requires the number of bits of statistical objects that have been received and aggregated and the number of statistical objects maintained in the table of all valid statistical objects. The specific probability p of a collision is $$p(n; d) \frac{d!}{d^n(d-n)!}$$

where n is the number of statistical objects in the table of valid statistical objects and d is the total number of unique statistical objects available. For general use, the approximation $p(n; d) \approx 1 - e^{-n^2/(2 \times d)}$ is used. The total number of unique statistical objects available d is $d = 2^b$ where b is the number of bits of statistical object information received.

Once the probability has been calculated, it is compared against the probability threshold. If the calculated probability is less than the probability threshold, then the statistical object has been identified with a confidence that the aggregate information received does not exceed the probability threshold set beforehand. If the probability exceed the threshold, nothing further is done and the system awaits the reception of another statistical object with related communications characteristics to increase the number of bits of information received and aggregates into the aggregate statistical object and the progress repeats itself.

A further optimization can be made by associating communications characteristics across multiple identifications of statistical objects. When a statistical object is identified and does not exceed the probability threshold, thereby confirming that it was generated from the original object, the communications characteristics are temporarily associated with that original object. When a subsequent statistical object with similar or identical communications characteristics is received, the received statistical object is checked against the associated original object. If the associated original object could produce the received statistical object, the statistical object is identified as being produced by the associated original object. When multiple original objects are associated with the same set of communications characteristics, the identification of the statistical object proceeds by aggregating the statistical object information and pruning the list of potential original objects until only a single original object remains. The statistical object is still aggregated in an aggregated statistical object to enable the aggregation of information for the probability calculation. The probability calculation is made using the number of bits of information received in the aggregate statistical object and the number of statistical objects that are associated with the communications characteristics that are associated with the original object. This results in a lesser amount of statistical object information being required to not exceed the probability threshold, because the communications criteria is being used as an additional descriminator. Multiple sets of communications characteristics can be associated original object and multiple original objects can be associated with a single set of communications characteristics. When a statistical object is identified as being produced by an original object, a timestamp or other mechanism for indicating recent activity is updated in the communications characteristics associated with the original object. The lack of communications characteristics associated with original objects after a period of time should have their association removed after such periods of inactivity exceed a threshold. Subsequent statistical object reception with those removed communications characteristics will proceed as unassociated communications until those communications are again associated with an original object.

To insure the security of the statistical objects being produced cannot be readily captured, copied and replayed as original, the algorithms used to generate the statistical objects uses additional information in addition to the original object as inputs. This additional information may include clocks, counters and other deterministic inputs. During the identification of a statistical object back to an original object, this additional information is also identified and used to further validate the identity of the original object.

The probability threshold has several unique uses. Firstly, the use of a probability threshold enables the system for statistical object identity to be used with varying numbers of statistical objects contained within the table of all valid statistical objects without having the probability of guessing a statistical object increase as statistical objects are added to the valid statistical object table. The system employed here simply requires additional statistical objects, thus increasing the amount of information available to maintain the desired probability. The second unique attribute of using the probability threshold is that the probability threshold can be changed by the entity performing statistical object identification without communication, knowledge or coordination of the change by the entity generating the statistical object. This is especially important in the context of cyber security where knowledge of a threat or attack may raise the level of security desired. This can be used by the entity receiving and performing statistical object identification to decrease the threshold, requiring more statistical information before the original object identity is confirmed. The ability to perform this function without requiring any communication or notification to the entity producing the statistical object is especially useful and novel.

Additional information can also be conveyed using statistical objects. When additional inputs are used in the generation of the statistical object, this information can be extracted during the statistical object identification process. Examples of such additional information includes, but is not limited to, information regarding the state of some system or process, an index into a table of information or other types of data.

A BRIEF DESCRIPTION OF THE DRAWINGS

Figure 12:
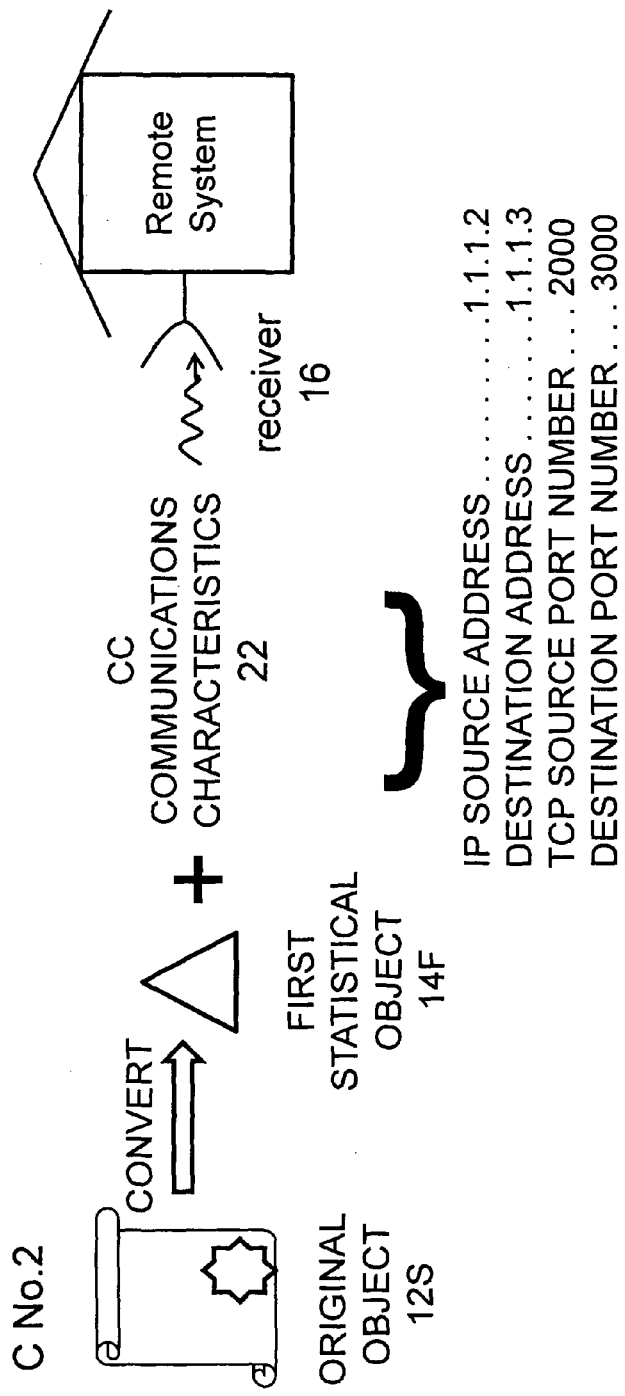

FIG. 12 furnishes a view of Ben's first communication with the remote system.

Figure 13:
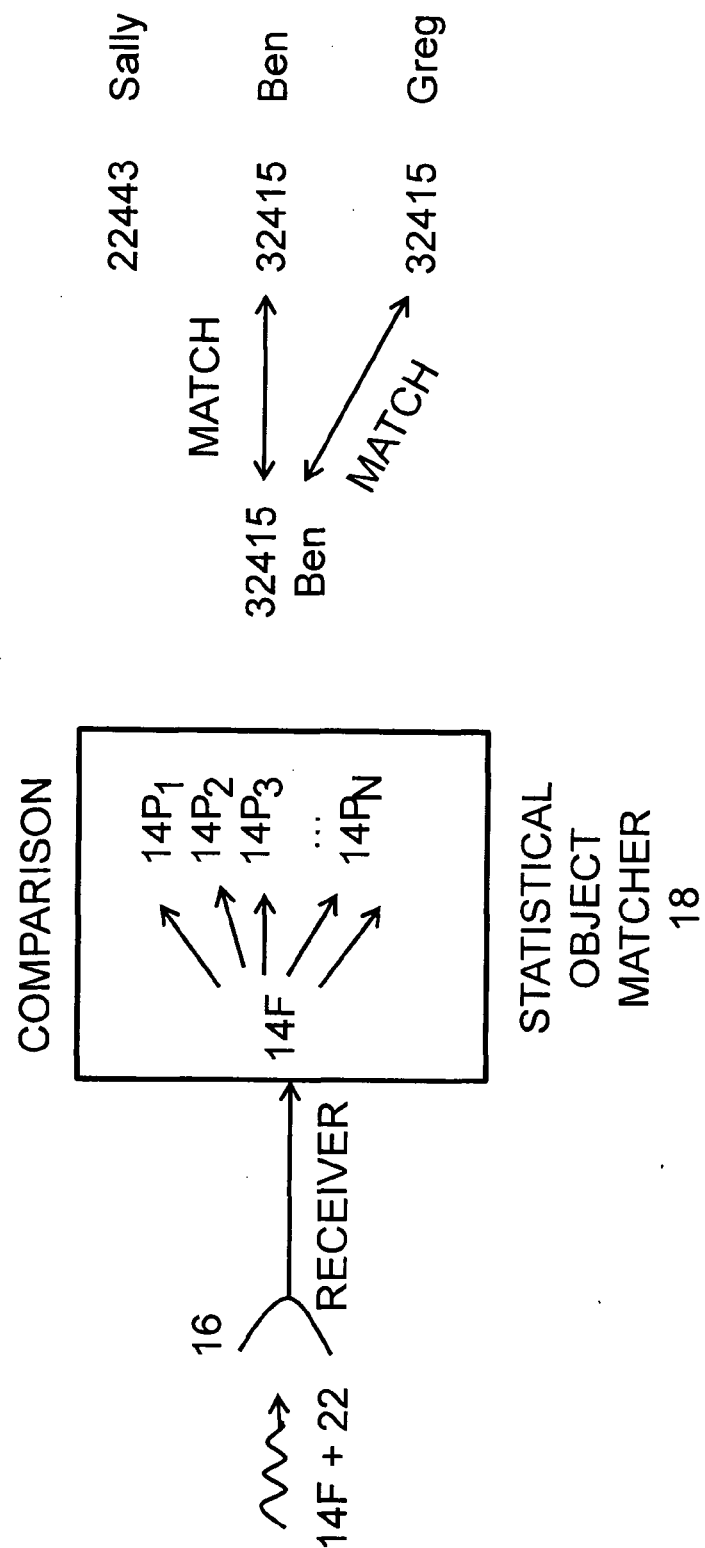

FIG. 13 depicts the comparison process that occurs within a statistical object matcher.

Figure 14:
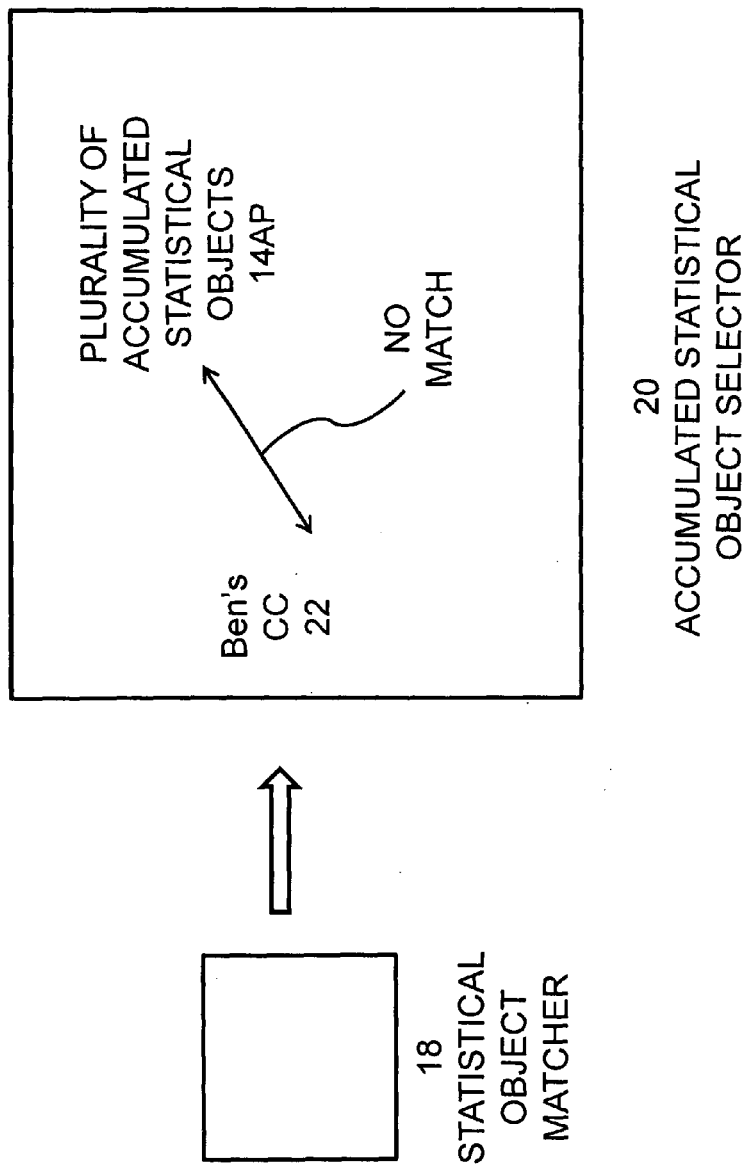

FIG. 14 illustrates the role of an accumulated statistical object selector.

Figure 15:
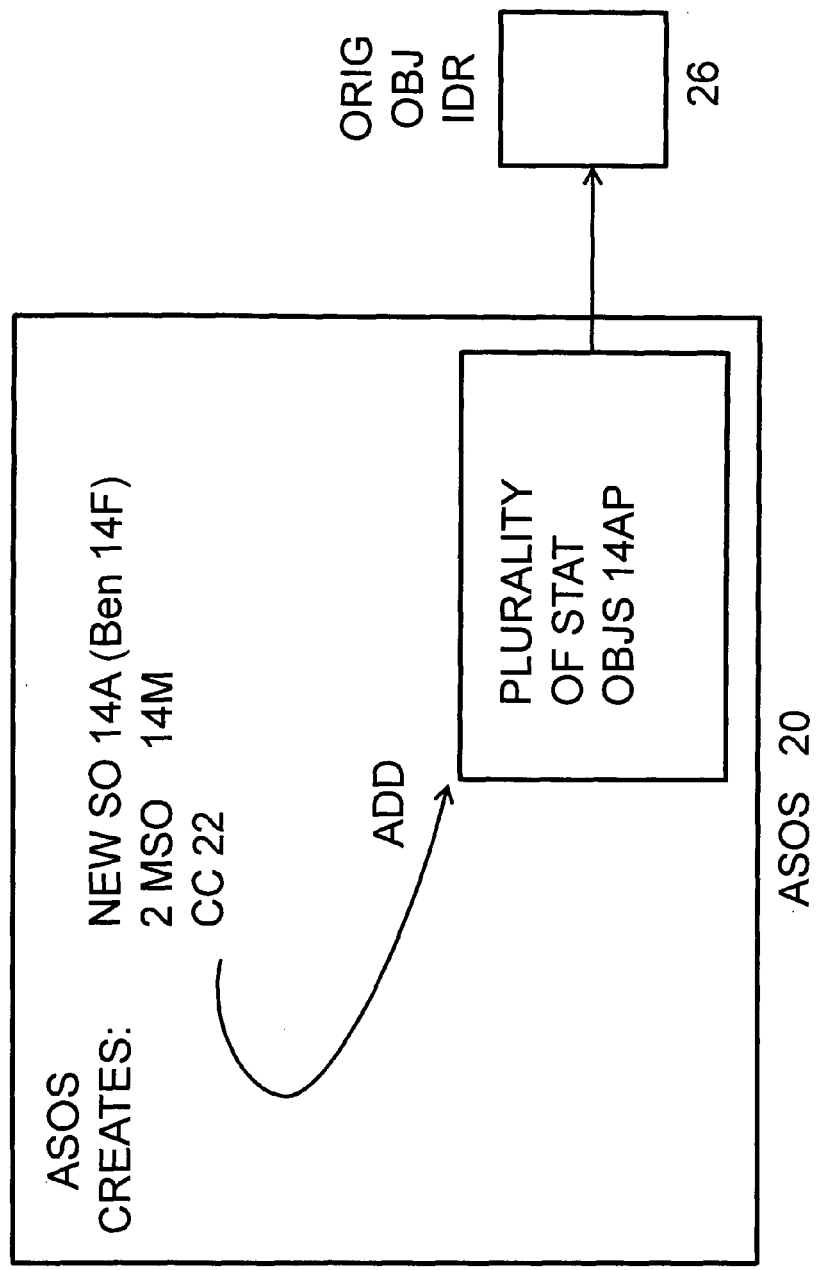

FIG. 15 illustrates the function of an accumulated statistical object selector.

Figure 16:
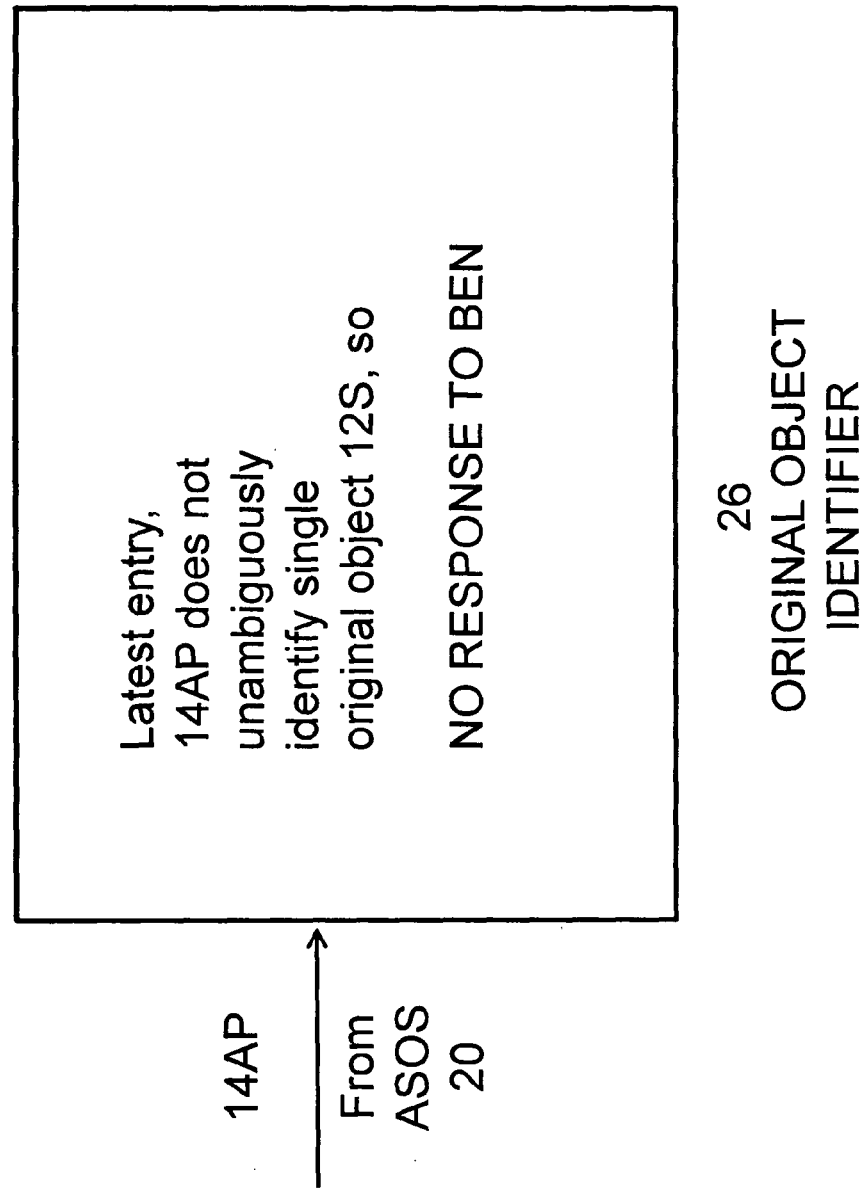

FIG. 16 illustrates the task of an original object identifier.

FIG. 17 shows that Ben's first communication has failed to be authenticated.

Figure 18:
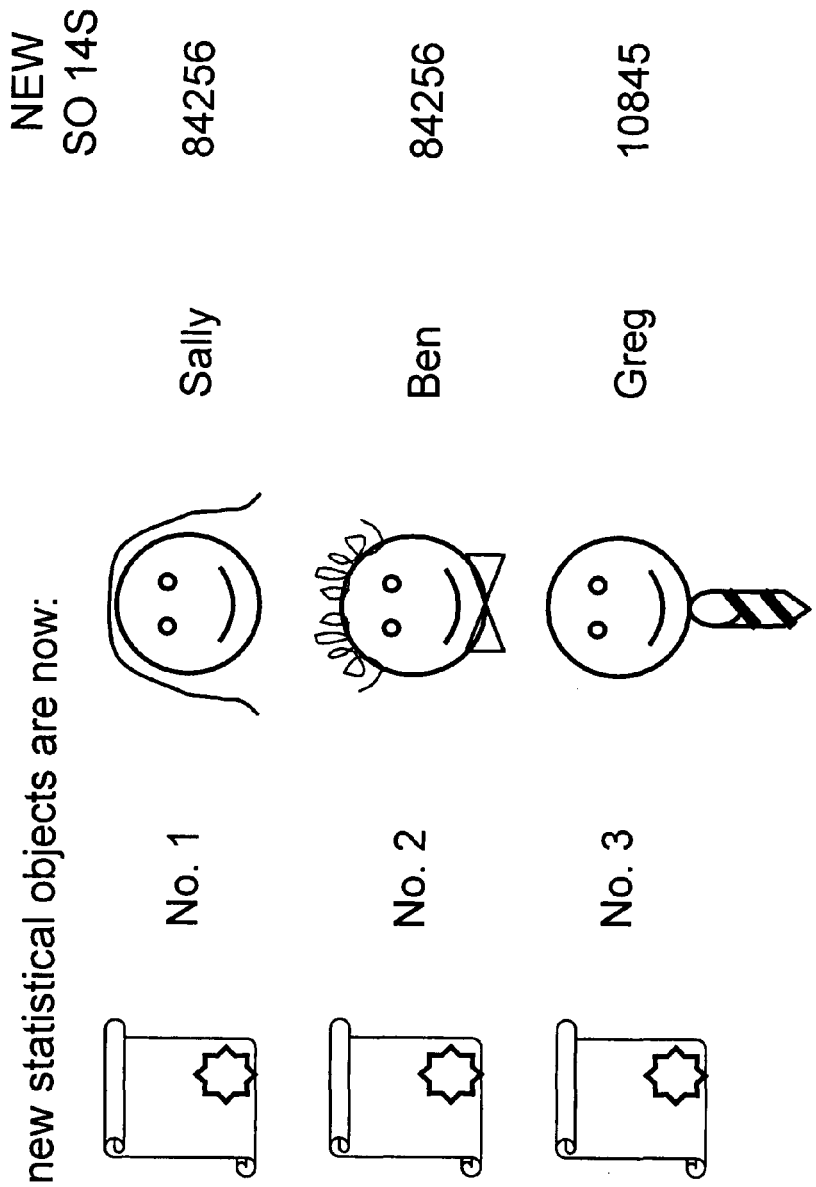

FIG. 18 supplies a schematic view of Ben's second attempt to communicate with the remote system.

Figure 19:
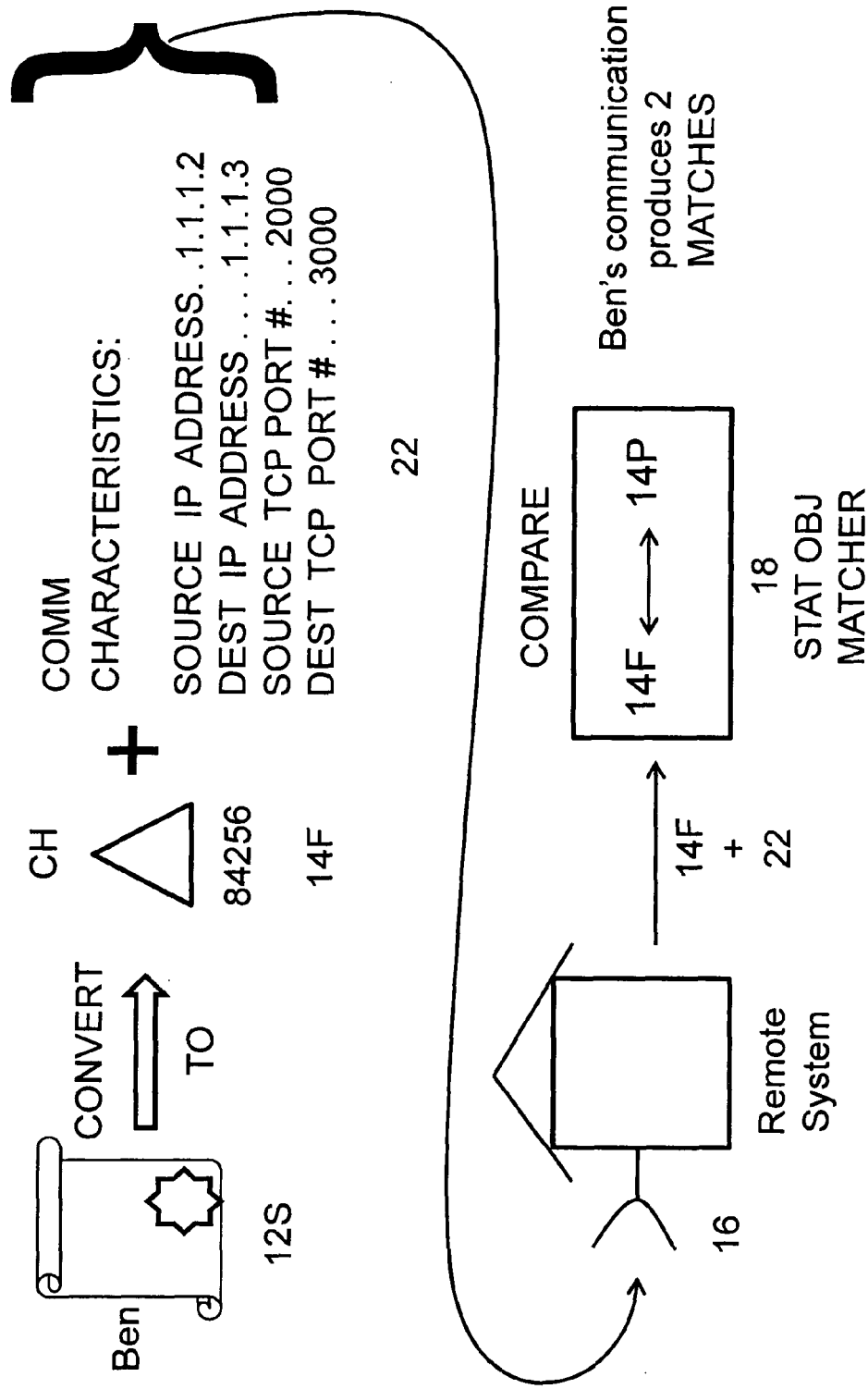

FIG. 19 depicts the second communication, and the resulting match that is produced in the statistical object matcher.

Figure 20:
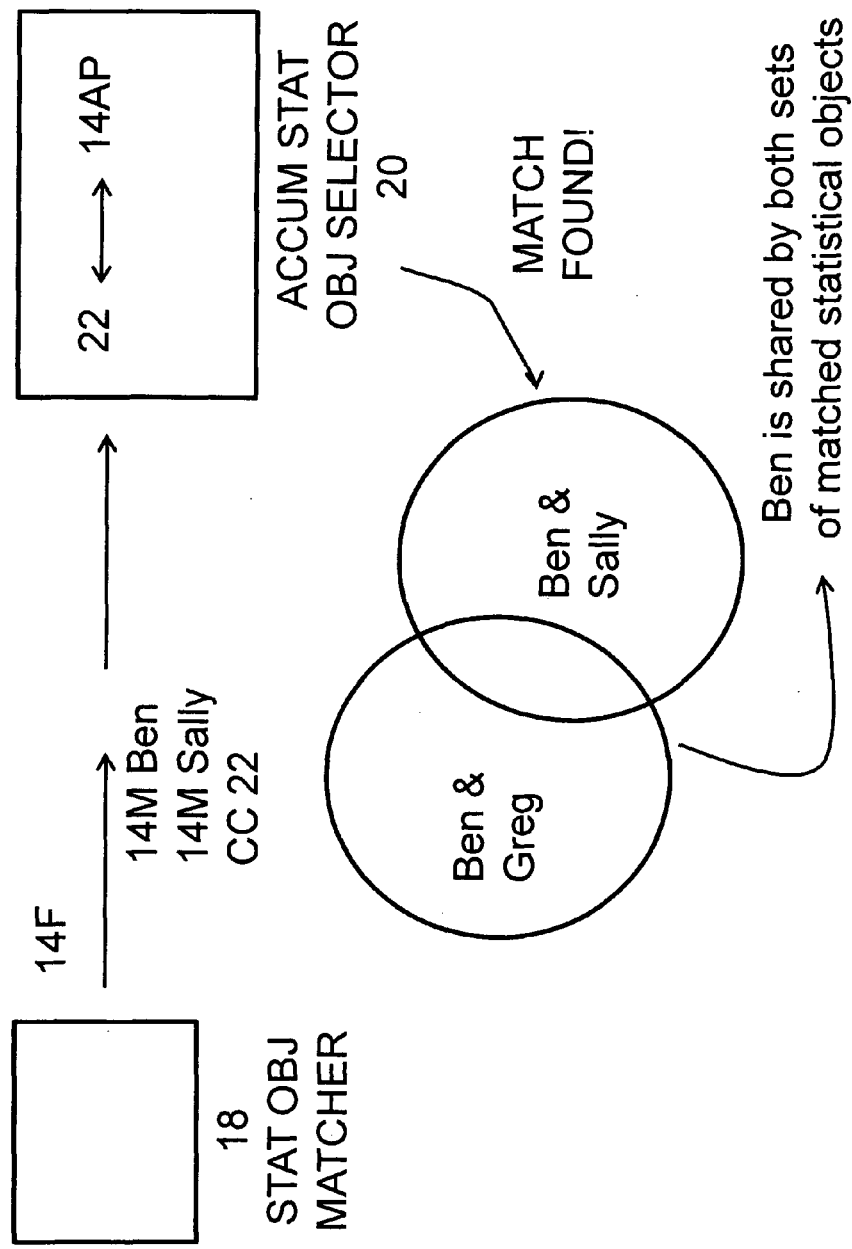

FIG. 20 illustrates the process of finding a match.

Figure 21:
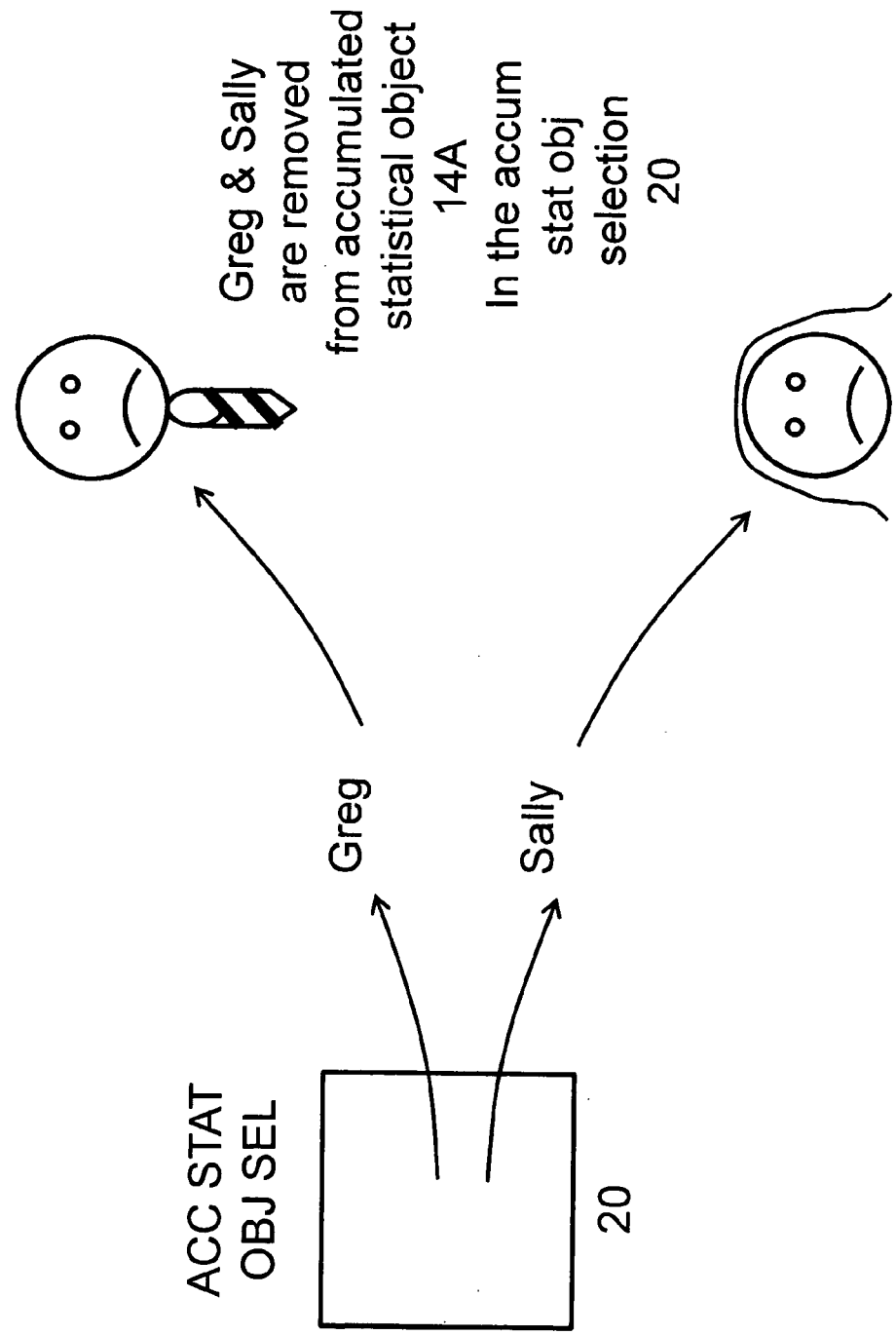

FIG. 21 shows how the accumulated statistical object selector discards statistical objects that do not lead to an authenticating match.

Figure 22:
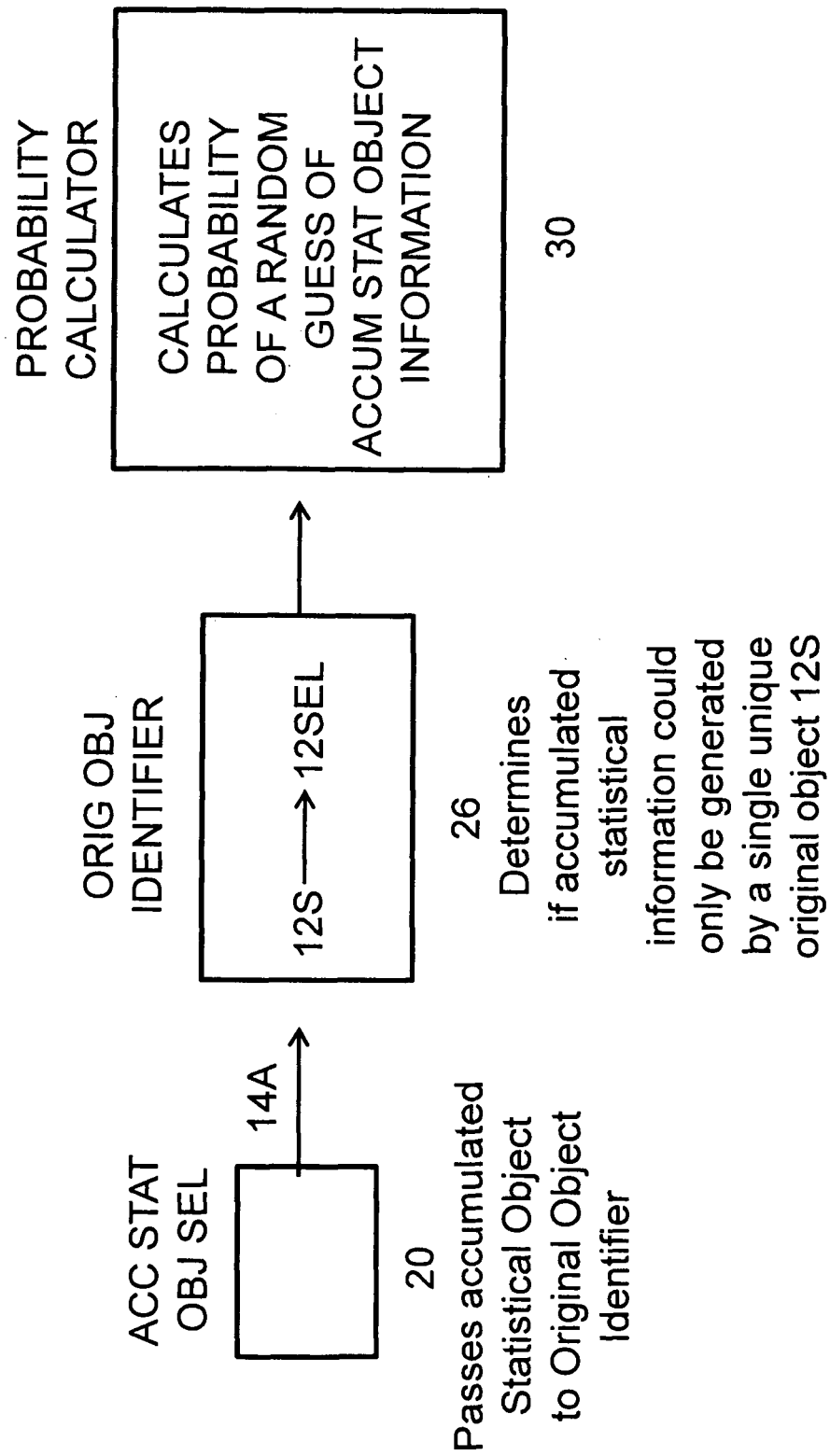

FIG. 22 furnishes a view of a probability calculator, which computes the probability of a successful guess of accumulated statistical object information.

FIG. 23 reveals the function of a threshold comparator, which compares the calculated probability to a probability threshold value.

FIG. 24 exhibits the final result, the authentication of Ben's second communication.

A DETAILED DESCRIPTION OF PREFERRED & ALTERNATIVE EMBODIMENTS

I. Overview of the Invention

One embodiment of the present invention provides a method for authenticating a communication. In an example contained in Section VI, a communication between a user (Ben) and a remote system is described. Communications received by the remote system must be authenticated before they are allowed. In this Specification, and in the Claims that follow, the terms authenticate and authentication are intended to mean that the identity of a communicator or an initiator of a communication has been verified, and that a particular communication is permitted, allowed or otherwise approved to proceed into the remote system.

One limitation of current information networks is that it is difficult to verify or approve a communication before the communication has been allowed to penetrate a network. One reason for this difficulty is that the means of verification, which is called a "certificate," is too large to send to the network in the initial set of digital information which initiates the communication, and which ultimately leads to an authentication.

One embodiment of the present invention solves this problem by reducing the information in the certificate which is used to authenticate the communication before it is allowed to proceed by converting the certificate to a much smaller "statistical object." The method allows the network to determine the identity of the initiator of the communication before the communication is given access to the network. This method provides a security feature that substantially eliminates potentially detrimental malicious attacks that could be perpetrated on the network using conventional technology.

II. Definition of Terms

Aggregate Statistical Object—A data structure containing one or more statistical objects, a list of potential original objects that may have created the original object(s) and the communications characteristics that provide the association between multiple statistical objects.

Authentication—Verifying the identity of a user, process, or device, often as a prerequisite to allowing access to resources in an information system.

Authenticating Device—A device that verifies the identity of a user, process or device.

Authentication Information—Information provided for the purpose of verifying the identity of a user, process or device.

Communications Characteristics—Any of the characteristics, both physical and logical, that are available to distinguish one communication from another and to group discrete communication events into one or more related sequences of communications events.

Connection—A logical pairing of two devices that enable them to communicate. A connection utilizes a series of packets to accomplish this. A TCP connection is an example of a connection.

Connection Request—A request by one device to another device to create a connection.

Device—A device is any object that is capable of being attached or wirelessly connected to and communicating on a network. Examples of devices include computers, servers, clients, laptops, PDAs, cell phones, smart phones, network appliances, storage systems, virtual appliances, switches, routers, load balancers, caches, intrusion detection systems, VPNs, authentication devices, intrusion prevention systems, and firewalls.

Digital Identity—A digital representation of a set of characteristics by which a user, process or device is uniquely recognized.

Hash or Hashing function—Any procedure or mathematical method that converts are large amount of data into a smaller amount of data. In one embodiment of the invention, the output may be a single integer or value which serves as an index to an array or database.

IP—IP is the Internet Protocol. The Internet Protocol is a data oriented protocol used by devices to communicate across a packet switched network. IP information is carried by an IP header in an IP packet. The IP header contains device address information, protocol control information and user data information.

Network—A network is a collection of computers, servers, clients, routers and devices that are connected together such that they can communicate with each other. The Internet is an example of a network.

Original Object—The inputs to the function that generates a statistical object. The original object can include additional inputs such as clocks, counters, nonces and other deterministic information.

Protocol—In the field of telecommunications, a protocol is the set of standard rules for data representation, signaling, authentication, error detection and other features required to send information over a communications channel. Not all protocols provide all of these features. Protocols with different features may be layered on top of one another to provide a more robust feature set. Examples of protocols are the IP protocol and the TCP protocol. These protocols are often used together and referred to as the TCP/IP protocol.

Protocol Entity—A device, function, process or procedure that implements a communications protocol.

Statistical Object—The output of a function that has a statistical distribution. Commonly, a statistical object is the output of a hashing function.

Symmetric Key—A cryptographic key that is used to perform both the cryptographic operation and its inverse, for example to encrypt and decrypt, or create a message authentication code and to verify the code.

Symmetric Key Authentication—An authentication algorithm that uses a symmetric key to create a message authentication code and to verify the code.

TCP—TCP is the Transmission Control Protocol. Using TCP, networked devices can create connections to one another, over which they can send data. The TCP protocol guarantees that data sent by one endpoint will be received in the same order by the other, and without any pieces missing. The TCP protocol also distinguishes data for different applications (such as a Web server and an email server) on the same device.

III. Preferred and Alternative Embodiments

Figure 1:
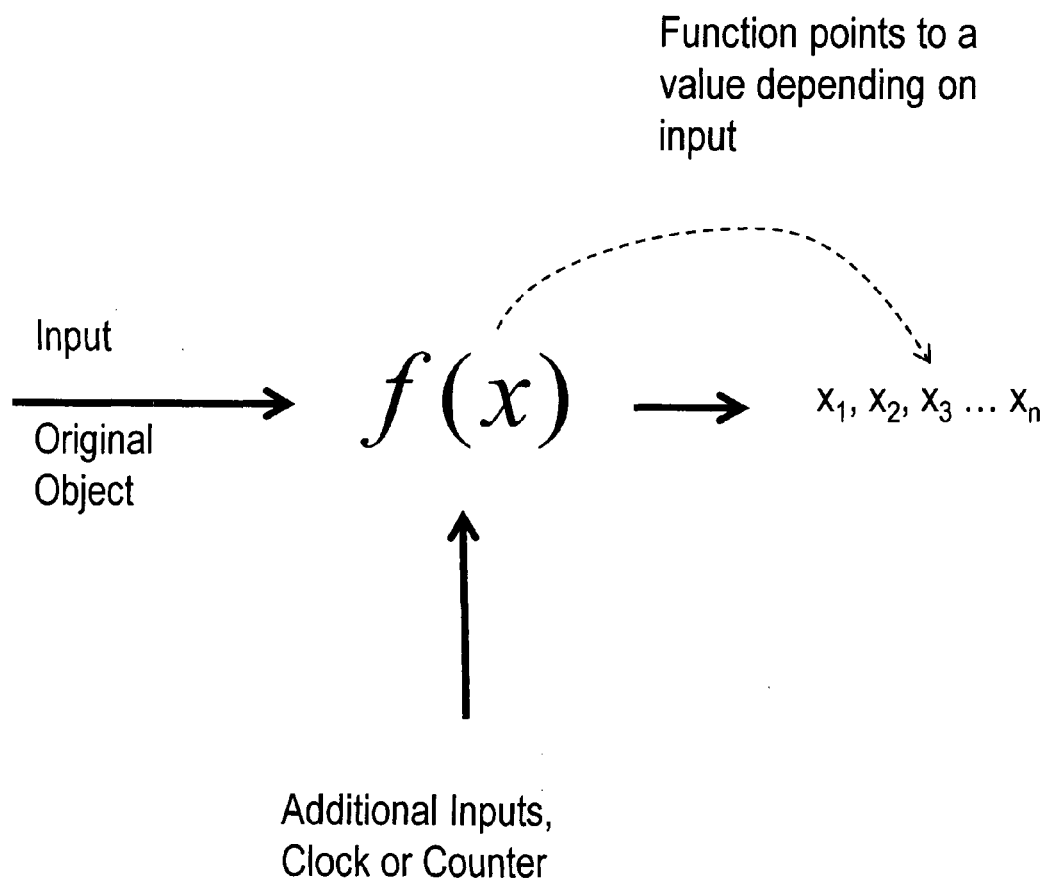
FIG. 1 illustrates the general operation of a hash function.

FIG. 1 is an illustration which shows one particular embodiment of the present invention, which includes a device 10. A device 10 stores and/or processes at least one original object 12S and at least one statistical object 14S. In another embodiment, the device 10 includes a plurality of original objects 12P and a plurality of statistical objects 14P. In this Specification, and in the Claims that follow, a single original object is identified as 12S (S for singular), while a plurality of original objects is accompanied by 12P (P for plurality). In this Specification, and in the Claims that follow, a single statistical object is identified as 14S (S for singular), while a plurality of statistical objects is accompanied by 14P (P for plurality). The term "device" is intended to encompass any suitable means for conveying and/or storing information or data. In the example described in Section VI, the device 10 is a remote system. In the embodiments described below, device 10 includes all the other components subsequently described in the Specification.

In one embodiment, the device 10 includes a communications receiver 16 which is connected to an external network and to a statistical object matcher 18. The statistical matcher 18 is connected to an accumulated statistical object selector 20, and has access to the plurality of statistical objects 14P stored in the device 10. The accumulated statistical object selector 20 is connected to an original object identifier 26 and has access to a plurality of accumulated statistical objects 14AP. The original object identifier 26 is connected to a probability calculator 30 and has access to the plurality of original objects 12P. The probability calculator 30 is connected to the threshold comparator 32 and has access to the plurality of statistical objects 14P. The probability comparator 32 is connected to the output of the device 10, and has access to a probability threshold value 27.

Figure 2:
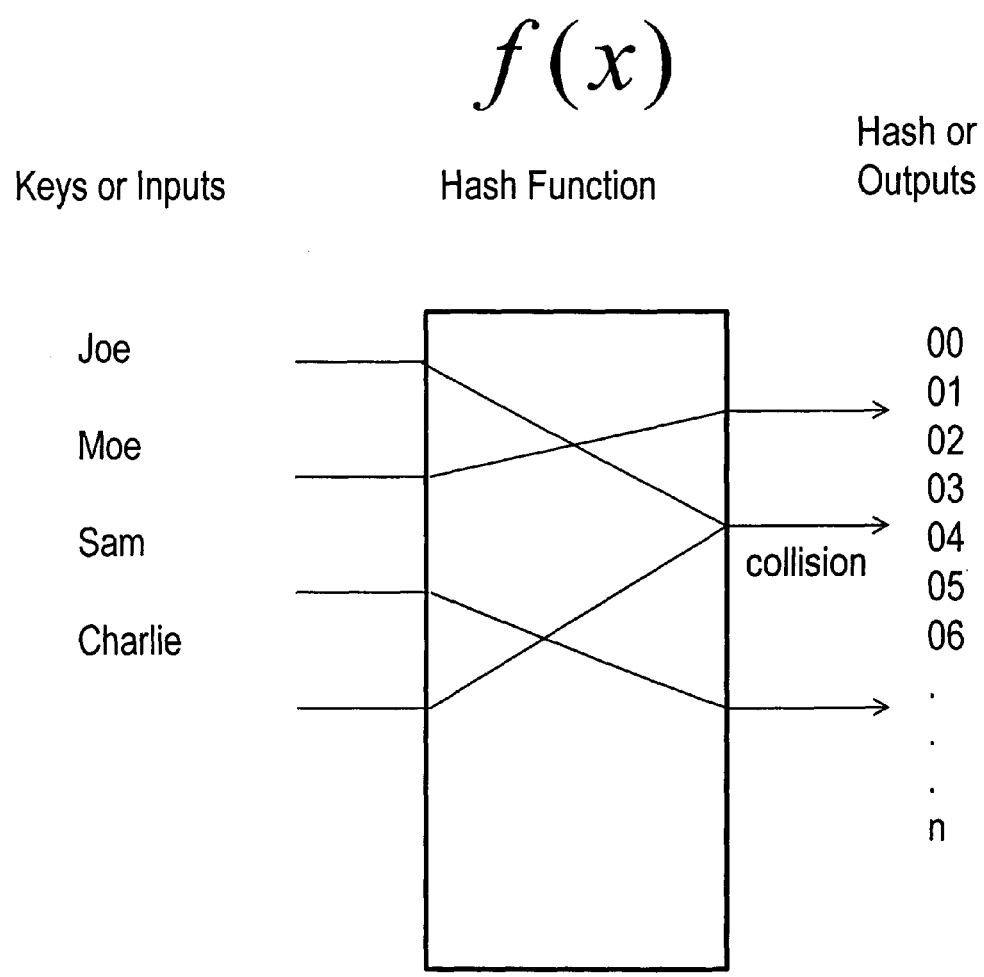
FIG. 2 shows how the hash function illustrated in FIG. 1 maps a set of inputs to a set of outputs.
Figure 3:
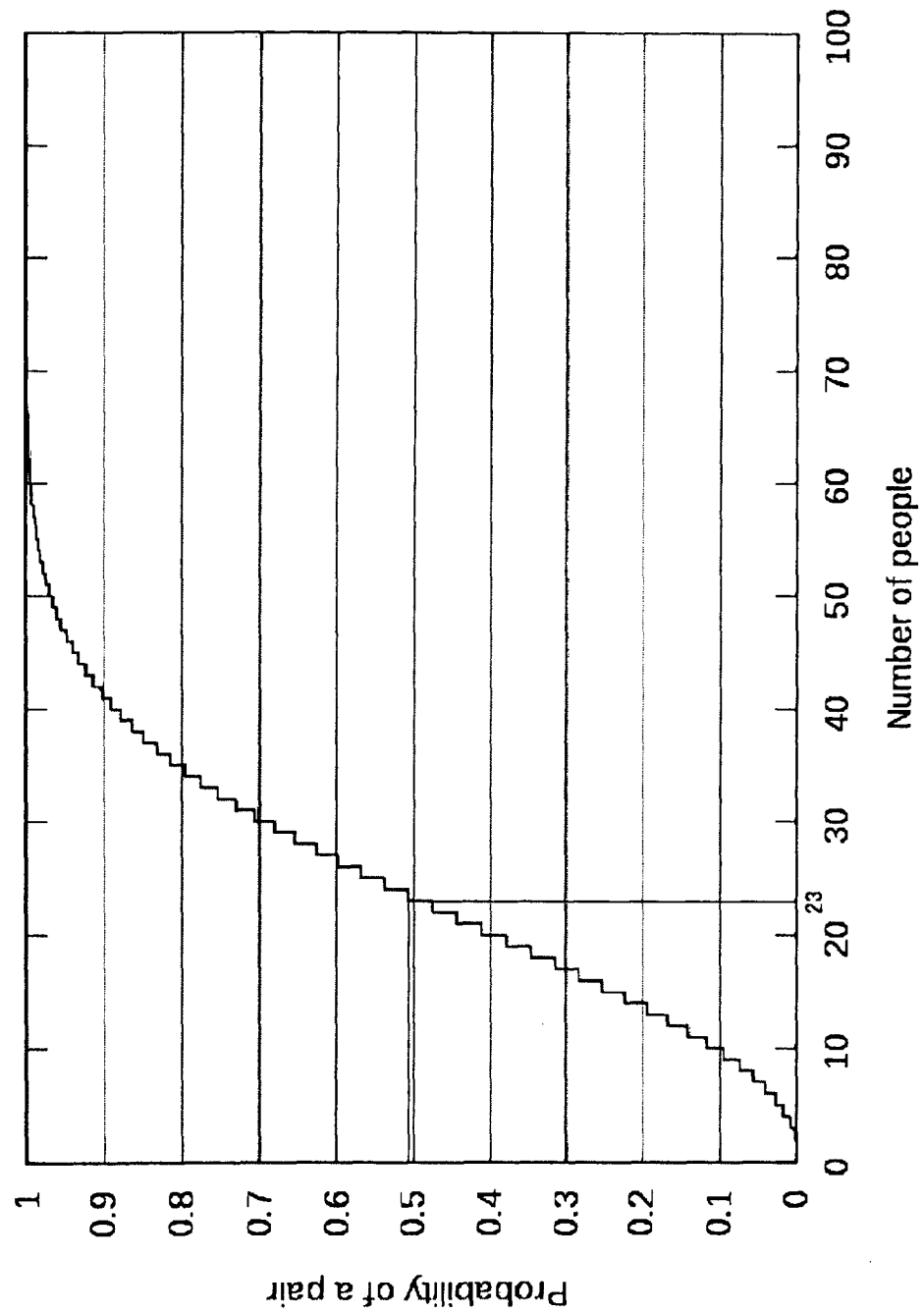
FIG. 3 is a graph that illustrates the birthday problem.
Figure 4:
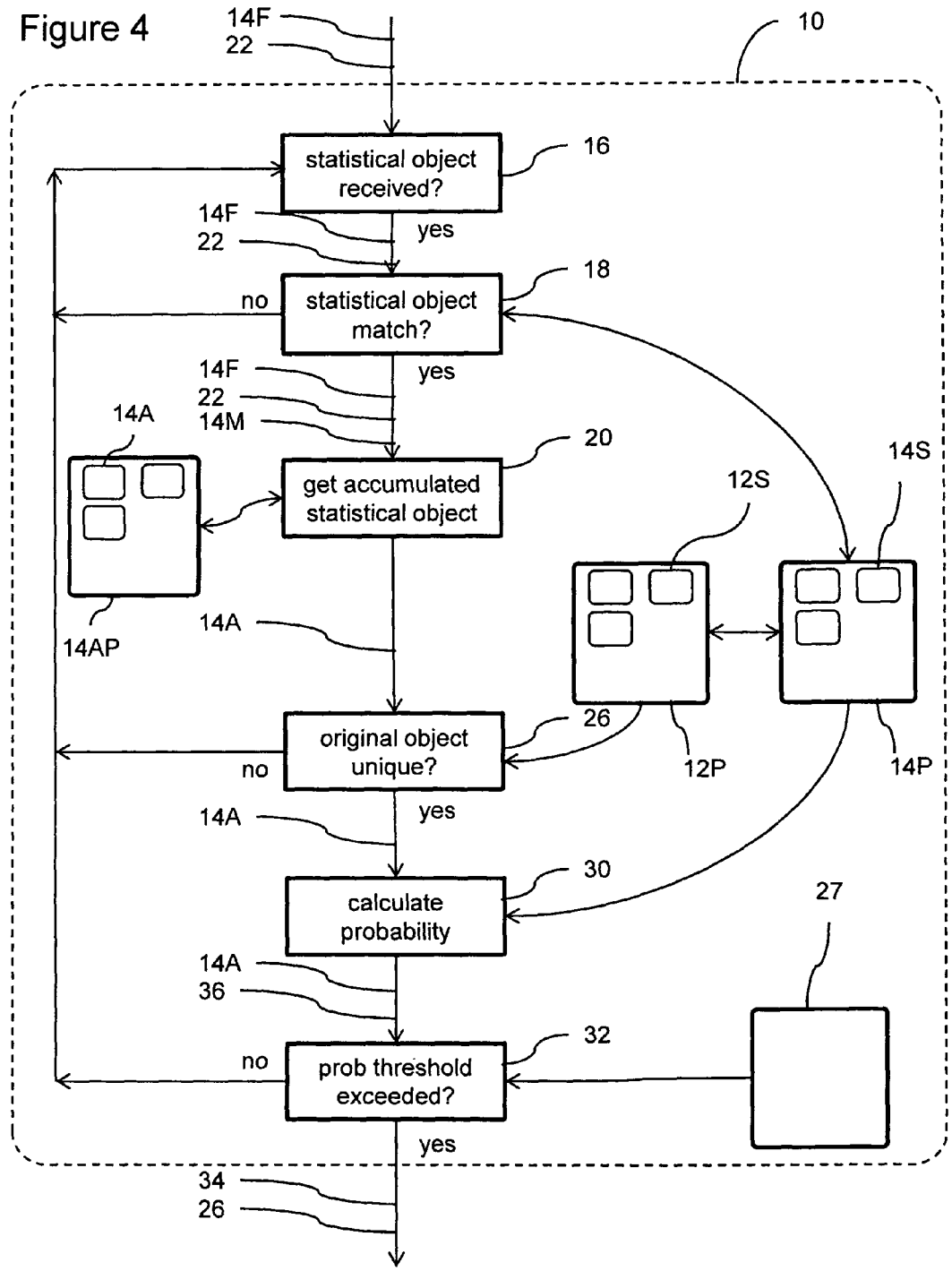
FIG. 4 is an illustration which shows an embodiment of the present invention.
Figure 5:
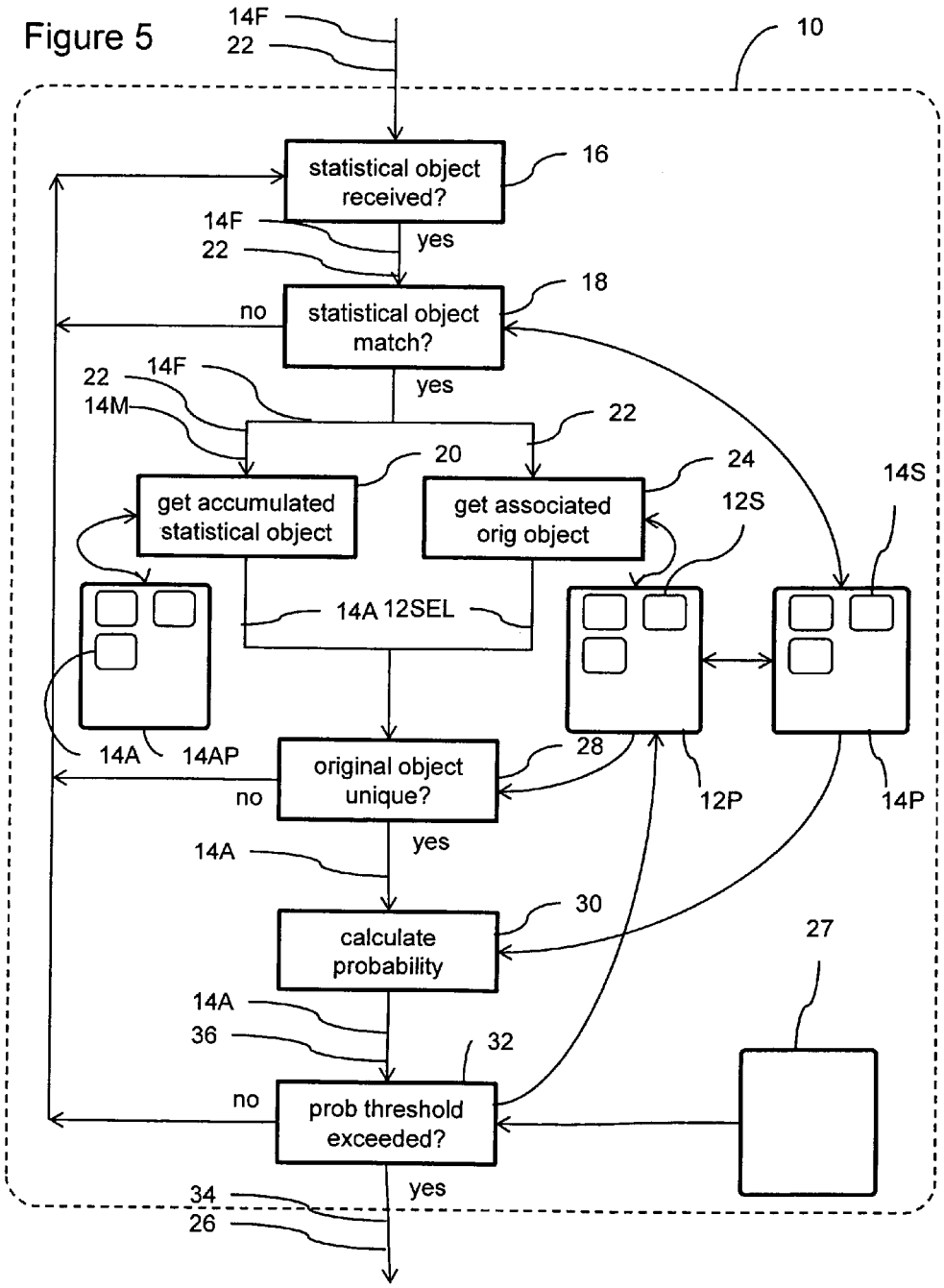
FIG. 5 is an illustration which shows an alternate embodiment of the present invention.
Figure 6:
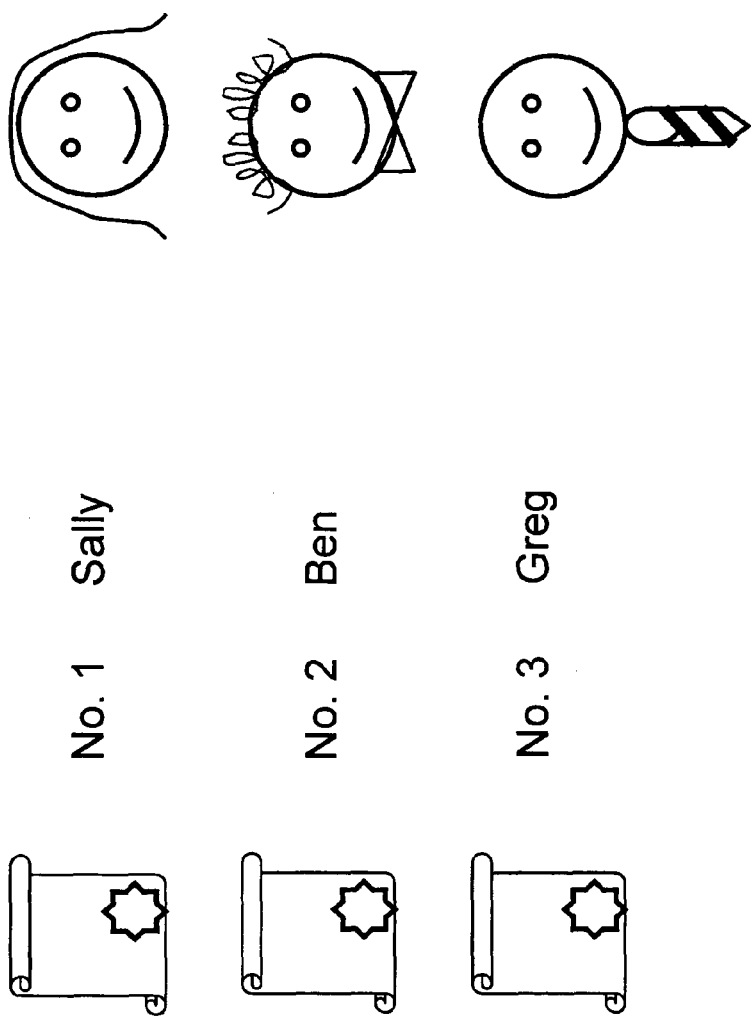
FIG. 6 illustrates certificates that are used to authenticate a communication.
Figure 7:
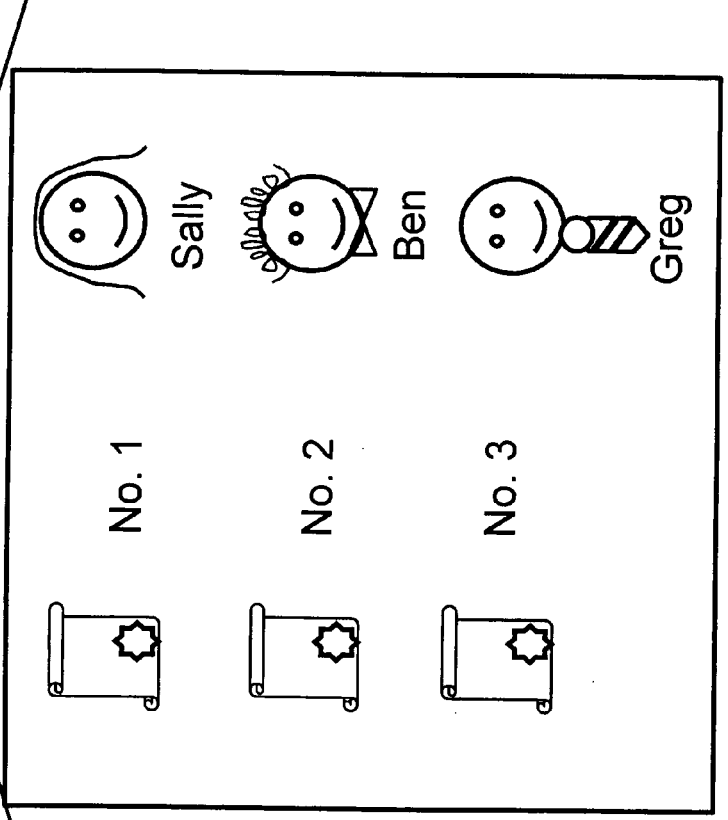
FIG. 7 shows certificates stored in a remote system.
Figure 8:
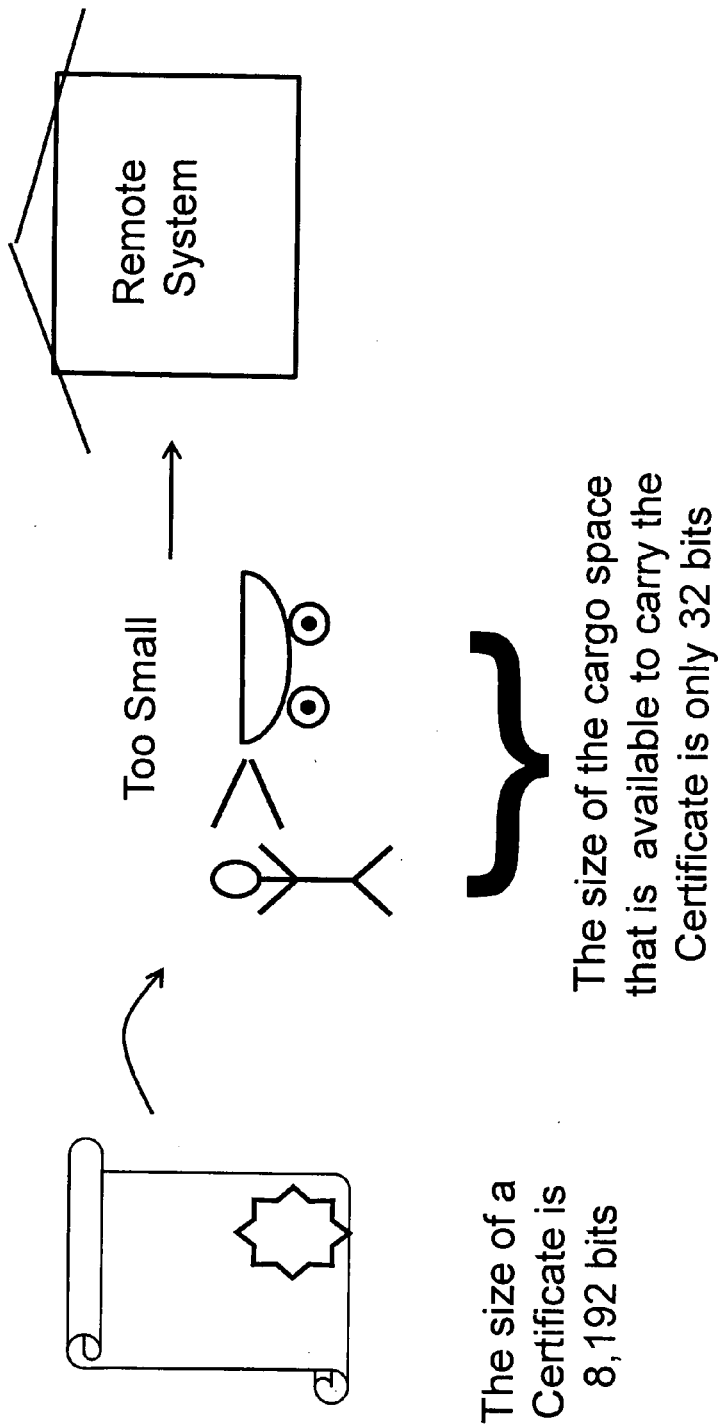
FIG. 8 shows that certificates are too large to send to the remote system in their original form.
Figure 9:
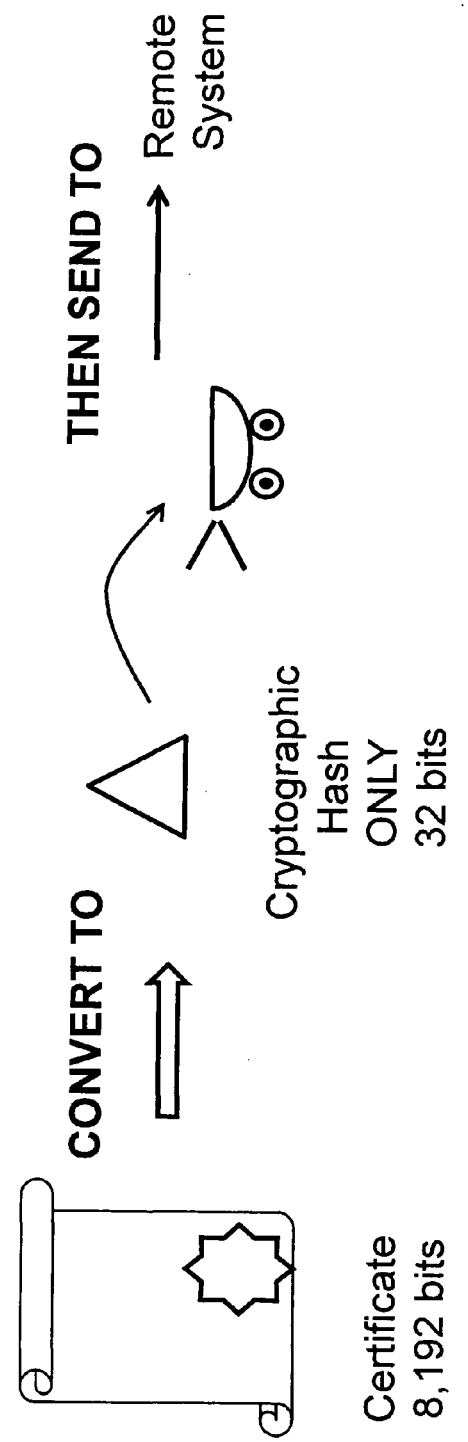
FIG. 9 depicts a solution: converting the certificates, which are original objects, to cryptographic hashes, or statistical objects.
Figure 10:
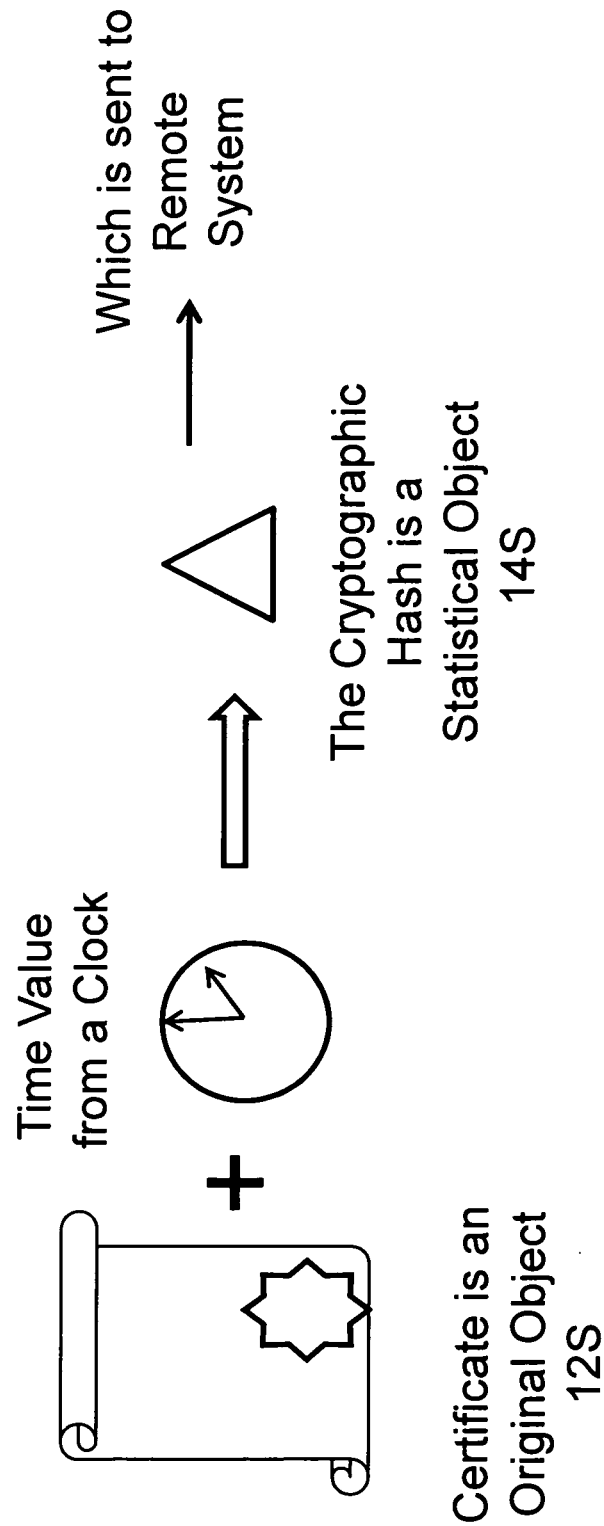
FIG. 10 shows how statistical objects and a time value from a clock are sent to the remote system.
Figure 11:
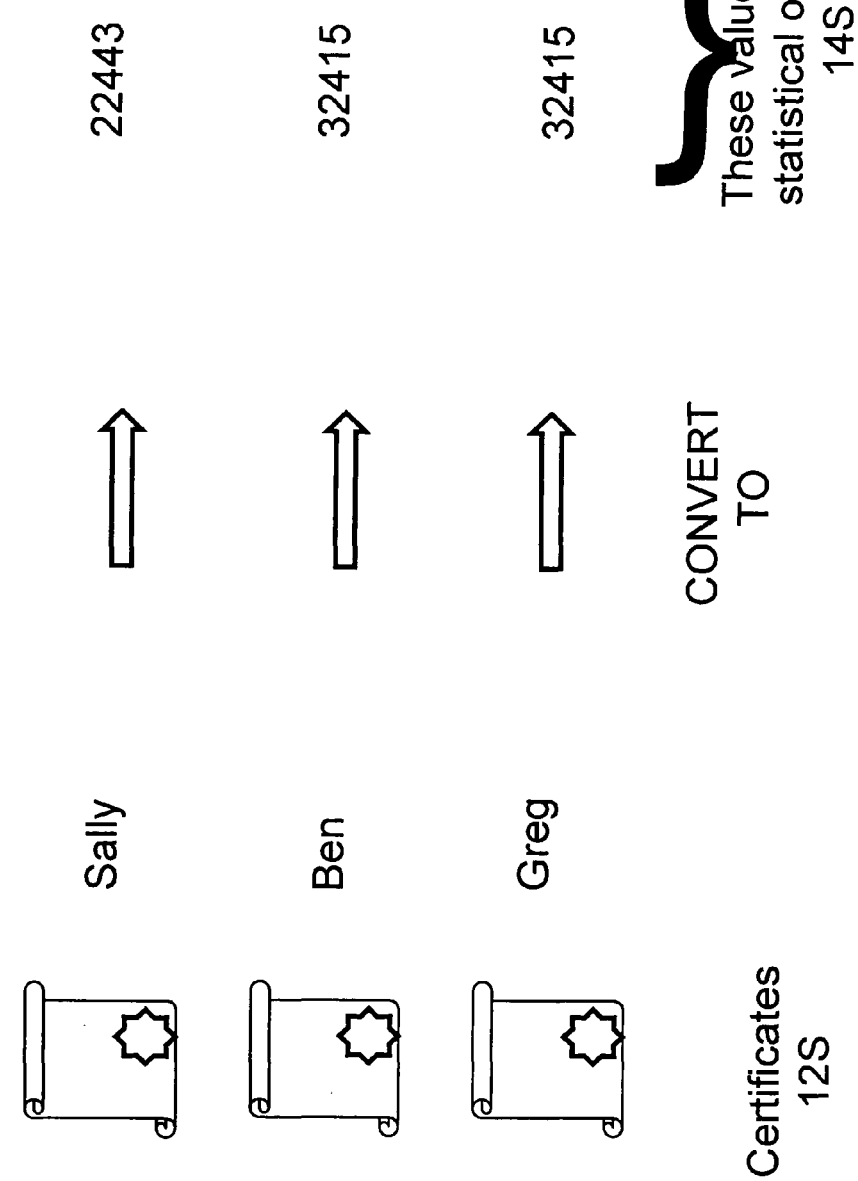
FIG. 11 illustrates the result of the conversion of three original objects to three statistical objects.

FIG. 2 is an illustration which shows an alternate embodiment of the present invention. Within a device 10, a plurality of original objects 12P is used to generate a plurality of statistical objects 14P. A communications receiver 16 is located within device 10, and is connected to the output of device 10 and to a statistical matcher 18. The statistical object matcher 18 is connected to an accumulated statistical object selector 20 and an associated original object selector 20 and has access to the plurality of statistical objects 14P. The accumulated statistical object selector 20 is connected to an associated original object identifier 28 and has access to a plurality of accumulated statistical objects 42. The associated original object selector 46 is connected to an associated original object identifier 28 and has access to a plurality of original objects 12P. The associated original object identifier 28 is connected to the probability calculator 30 and has access to the plurality of statistical objects 14P. The probability calculator 30 is connected to the threshold comparator 32 and has access to the plurality of statistical objects 14P. The probability calculator is connected to the external of the device 10, and has access to a threshold probability value 27 and the plurality of original objects 12P.

IV. Methods of Operation for Statistical Object Identification

In a preferred embodiment of the invention, a device 10 contains a plurality of original objects 12P. For each original object 12S, at least one statistical object 14S is generated.

Multiple statistical objects 14P may be generated from a single original object 14S and each statistical object 14S has a name, pointer or other indication of the original object 12S from which it was created. Since multiple statistical objects 14P may be created from a single original object 12S, multiple pointers or other indications to the additional inputs to the statistical object generator may also be provided. These additional inputs may include clock information, keying information, state information, and other relevant and useful information. The plurality of statistical objects 14P generated from the plurality of original objects 12P is maintained and is available within the device 10. The plurality of statistical objects 14P may be individually or as a group, periodically removed, added to, invalidated or otherwise refreshed. Likewise, the plurality of original objects 12P may be individually or as a group removed, added to, invalidated or otherwise refreshed.

When a first statistical object 14F is received by a communications receiver 16, it is received within the context of a communications and has communications characteristics 22 associated with it. These communications characteristics 22 may include the network address of the sender of the communications, the physical interface or port upon which the communication was received, the logical interface upon which the communication was received. For network communications, the communications characteristics 22 may include the IPv4 or IPv6 address of the sender, session information including local and remote addresses and local and remote port numbers, VLAN identifiers and other network, protocol stack and application information. Communications characteristics 22 may also include security association information. Physical characteristics of the communications characteristics 22 may include the frequency or frequencies that the communication was received. Physical characteristics of communications characteristics 22 may also include phase information, time information and amplitude information.

After a first statistical object 14F has been received, using a statistical matcher 18, the first statistical object 14F is compared against the plurality of statistical objects 14P. If a matching statistical object 14M is not found, the first statistical object 14F is not identified and no further statistical object resolution activity occurs on this reception of a statistical object. If there is at least one statistical object 14S in the plurality of statistical objects 14P that matches the first statistical object 14F, then the first statistical object 14F, all matching statistical objects 14M and indicators to their respective original objects 12P and the communications characteristics 22 are passed to an accumulated statistical object selector 20. The accumulated statistical object selector 20 takes the input communications characteristics 22 and looks for an accumulated statistical object 14A within the plurality of accumulated statistical objects 14AP that has matching communication characteristics 22. If a matching accumulated statistical object 14MA is found, the first statistical object 14F and the list of all original objects 12P associated with the matched statistical objects 14M are added to the matched accumulated statistical object 14MA. This increases the amount of statistical object information. If a matching accumulated statistical object 14MA is not found, a new accumulated statistical object 14NA is created and added to the plurality of accumulated statistical objects 14AP. The communications characteristics of the accumulated statistical object is copied from the communications characteristics 22, the first statistical object 14F and the list of all original objects 12P associated with the matched statistical objects 14M are added to the accumulated statistical object 14A. In both cases, the resulting accumulated statistical object 14A is passed to the original object identifier 26.

If an accumulated statistical object 14A is inactive for a period of time, the accumulated statistical object 14A may be removed from the plurality of accumulated statistical objects 14AP. An accumulated statistical object 14A may be considered inactive if it has not unambiguously selected a unique original object 12S and first statistical objects 14FP with matching communications characteristics 22 have not been received for a period of time. An accumulated statistical object 14A may also be considered inactive if it has selected a unique original object 12S, but the accumulated statistical object exceeds the probability threshold value 27 and first statistical objects with matching communications characteristics 22 have not been received for a period of time.

The original object identifier 26 takes the given accumulated statistical object 14A and determines if the accumulated statistical information within the accumulated statistical object could only be generated by a single, unique original object 12S. This determination is made by successively pruning associated original objects that, as additional statistical object information is added, fail to be able to generate the stream of statistical objects that matches the received statistical objects until only a single original object remains. If a unique original object 12S is not determined, the accumulated statistical object 14A is updated with the pruned list of associated original objects 12P, and no further statistical object resolution activity occurs on this reception of a statistical object. If a unique original object 12S is determined, the selected original object 12SEL is indicated in the accumulated statistical object 14A and the accumulated statistical object 14A is sent to a probability calculator 30. The probability calculator 30 takes the given accumulated statistical object 22 and based on the number of bits of statistical object information that has been accumulated in the accumulated statistical object 22 and the number of statistical objects in the plurality of statistical objects 14P calculates the probability of guessing the accumulated statistical object information. The calculated probability 36 is sent to the threshold comparator 32. The threshold comparator 32 takes the given calculated probability 36 and compares that value with the threshold value 28. The threshold value may be taken from an original object 12S, may be a configurable value for the plurality of original objects 12P within device 10, or may be controlled by an outside entity. The threshold value may be associated with the device 10. If the threshold comparator 32 determines that the calculated probability 36 exceeds the probability threshold value 27, no further statistical object resolution activity occurs on this reception of a statistical object 14S. If the threshold comparator 32 determines that the calculated probability 36 is less than the probability threshold value 27, an indication 34 is produced that includes the selected original object 26SEL. The indication 30 may also include the communications characteristics 22 and any other available information required by the received of the indication 34. The indication may also contain additional inputs to the statistical object generator, which may be provided by pointer from a statistical object 14S. These additional inputs may include clock information, keying information, state information, and other relevant and useful information.

By utilizing a probability threshold value 27, a threshold comparator 32 and calculating, in real time, the present probability of guessing an accumulated statistical object 22 based on the number of statistical objects present in the plurality of statistical objects 14P, the probability of guessing an accumulated statistical object is held constant while the number of statistical objects present in the plurality of statistical objects 14P can vary. Likewise, the probability of guessing a first statistical object 14F is also held constant. It must also be noted that the probability threshold value 27 can be changed at any time. The change in probability threshold value 27 does not require the communication or coordination with the generator of the first statistical object 18. Because of this, the probability threshold value 27 can be adjusted, and the system for statistical object identification will not provide any response until the threshold value has been met. This effectively allows the statistical object identification system to silently increase or decrease the probability threshold value 27 without providing any detectable indication of the change in the probability threshold value 27.

In an alternate embodiment of the invention, a device 10 contains a plurality of original objects 12P. For each original object 12S, at least one statistical object 14 is generated. Multiple statistical objects 14 may be generated from a single original object 6 and each statistical object 14 contains a name, pointer or other indication of the original object 16 from which it was created. The plurality of statistical objects 14P generated from the plurality of original objects 14P is maintained and is available within the device 10. The plurality of statistical objects 14P may be individually or as a group periodically removed, added to, invalidated or otherwise refreshed. Likewise, the plurality of original objects 12P may be individually or as a group removed, added to, invalidated or otherwise refreshed.

When a first statistical object 14S is received by a communications receiver 16, it is received within the context of a communication and has communications characteristics 22 associated with it. After a first statistical object 18 has been received, using a statistical matcher 18, the first statistical object 18 is compared against the plurality of statistical objects 14P. If a matching statistical object 14 is not found, the first statistical object 18 is not identified and no further statistical object resolution activity occurs on this reception of a statistical object. If there is at least one statistical object 14S in the plurality of statistical objects 14P that matches the first statistical object 14F, the first statistical object 14F, all matching statistical objects 14P and indicators to their respective original objects 12P and the communications characteristics 22 are passed to an accumulated statistical object selector 20. The communications characteristics 22 are also passed to a associated original object selector 24.

The accumulated statistical object selector 20 takes the input communications characteristics 22 and looks for an accumulated statistical object 14A within the plurality of accumulated statistical objects 14AP that has matching communication 20 characteristics 22. If a matching accumulated statistical object 14A is found, the first statistical object 14F and the list all original objects 12P associated with the matched statistical objects 14M are added to the matched accumulated statistical object 14MA. This increases the amount of statistical object information. If a matching accumulated statistical object 14MA is not found, a new accumulated statistical object 14NA is created and added to the plurality of accumulated statistical objects 14PA. The communications characteristics 22 of the accumulated statistical object 14A is copied from the communications characteristics 22, the first statistical object 14F and the list of all original objects 12P associated with the matched statistical objects 14M are added to the accumulated statistical object 14A. In both cases, the resulting accumulated statistical object 14A is passed to the original object identifier 26.

The associated original object selector 24 takes the input communications characteristics 22 and looks for an original object 12S within the plurality of original objects 12P that has matching communications characteristics. If a matching original object 12M is found, that original object is selected, becoming a selected original object 12S and is passed to the associated original object identifier 26. If there is not matching original object 12M, then nothing is passed to the associated original object identifier 28. If an original object 16 is inactive for a period of time, the association with communications characteristics 22 may be removed from the original object 16. An original object 16 may be considered inactive if first statistical objects 18 with matching communications characteristics 22 have not been received for a period of time. An original object 16 may also be considered inactive if first statistical objects 18 produced by the associated original object 16 have not been received for a period of time.

The associated original object identifier 28 takes the given accumulated statistical object 22 and the selected original object 26 and determines if the accumulated statistical information within the accumulated statistical object 22 could have been produced by the selected original object 26. If the information contained within the accumulated statistical object 14A could have been generated by the selected original object 12SEL, the selected original object 12SEL is indicated in the accumulated statistical object 22 and the accumulated statistical object 22 is sent to the probability calculator 30. If the information contained within the accumulated statistical object 22 cold not have been produced by the selected original object 12SEL, the selected original object 12SEL is discarded and the following processing omits.

The associated original object identifier 28 takes the given accumulated statistical object 22 and determines if the accumulated statistical information within the accumulated statistical object could only be generated by a single, unique original object 12S. This determination is made by successively pruning associated original objects that, as additional statistical object information is added, fail to be able to generate the stream of statistical objects that matches the received statistical objects until only a single original object remains. If a unique original object 12S is not determined, the accumulated statistical object 14A is updated with the pruned list of associated original objects 12P and no further statistical object resolution activity occurs on this reception of a statistical object. If a unique original object 12S is determined, the selected original object 12SEL is indicated in the accumulated statistical object 14A and the accumulated statistical object 14A is sent to the probability calculator 30. The probability calculator 30 takes the given accumulated statistical object 14A and based on the number of bits of statistical object information that has been accumulated in the accumulated statistical object 14A and the number of statistical objects 14 in the plurality of statistical objects 12P that have matching communications characteristics 22, calculates the probability of guessing the accumulated statistical object information. The calculated probability 36 is sent to the threshold comparator 32. The threshold comparator 32 takes the given calculated probability 36 and compares that value with the probability threshold value 27. The threshold value may be taken from an original object 12S, may be a configurable value for the plurality of original objects 12P within device 10 or may be controlled by an outside entity. If the threshold comparator 32 determines that the calculated probability 36 is greater than the probability threshold value 27, no further statistical object resolution activity occurs on this reception of a statistical object. If the threshold comparator 32 determines that the calculated probability 36 is less than the probability threshold value 27, an indication 30 is produced that includes the selected original object 12SEL and an association is made within the plurality of original objects 12P between the selected original object 12SEL and the communications characteristics 22. The indication 30 may also include the communications characteristics 22 and any other available information required by the received of the indication 30. The association between an original object 12S and communications characteristics 22 can also be created prior to receiving a first statistical object 14F. This allows the system to be pre-populated with associations that should accelerate the selection of original objects and make staying beneath the probability threshold value 27 easier.

In addition to the preferred and alternate embodiments described above, there are a number of additional processes that assist the process. As the primary mechanism for accumulating information between related statistical objects is driven by the reception of those statistical objects, it is therefore necessary to consider how to handle a partially identified statistical object which is then orphaned. An orphaned partially identified statistical object is a aggregate statistical object that has not been fully identified or has exceeded the probability threshold when the reception of matching communications characteristics ceases, thereby preventing further progress. For this case, each accumulated statistical object 14A should have a timestamp or similar aging construct that will enable the system to periodically age out idle, orphaned and otherwise unused objects. This includes the removal of communication characteristics 22 that have been associated with original objects 12P after matching communications have been idle for a period of time.

As the communications of statistical objects is usually performed when the secured transport of an original object cannot be accomplished, it is therefore important that the security and integrity be taken into account in any implementation. To insure that a statistical object cannot be intercepted during transmission and used by the interceptor, once a statistical object 14S matched from the plurality of statistical objects 14P, then that statistical object 14S should be invalidated and the device 10 should generate a new, different statistical object 14S from the same original object 12S. To further protect against attach, each statistical object 14S should also expire after a period of time if that statistical object 14S has not been matched and invalidated.

The association of communications characteristics 22 is usually performed after the successful identification of an original object 12S and after the calculated probability 36 is determined to be less than the probability threshold value 27. It is also possible to pre-assign communications characteristics 22 to original objects 12P. This will decrease the amount of statistical object information necessary to identify the associated original object. Unlike dynamically associated communication characteristics, pre-assigned associations should not expire after periods of inactivity.

This method of statistical object identity allows the system to maintain a constant probability threshold, regardless of the number of statistical objects that are contained within the plurality of statistical objects. This is accomplished by always calculating the probability of guessing the information contained in the accumulated statistical object with respect to both the number of statistical objects that are contained within the plurality of statistical objects and the accumulated statistical object information. As the number of statistical objects in the plurality of statistical objects increases, the probability of guessing increases while as the amount of statistical object information accumulates, the probability of guessing decreases. By comparing the result of the probability calculation against the probability threshold after each reception of a statistical object that results in an identified original object, adherence to the probability threshold is enforced.

This method of statistical object identity is designed to specifically enable the changing of the probability threshold and not require that the changed probability threshold be coordinated or otherwise communicated with the entities that are generating and sending the statistical objects. By not requiring any coordination or communication when changing the probability threshold, the device can change the probability threshold in response to other external factors such as the threat or presence of attack or other security or integrity event.

V. Apparatus for Statistical Object Identification

The apparatus that performs statistical object identification is varied and diverse. It ranges from a simple, single function device that receives statistical objects via a network or other communications medium, and identifies the original object. Once the identification is made, the communication may be forwarded to its intended destination. Before identification is made, no communications are allowed to pass across the device. It is expected that in many cases, the apparatus will be a module or subsystem within a larger system. This module may take the form of a state machine in a application specific integrated circuit (ASIC) or other form of integrated circuit or semiconductor implementation. This module may also take the form of logic coding provided to a programmable logic device such as a field programmable gate array (FPGA), programmable array logic (PAL) and other forms of programmable logic. This module may also take the form of instructions for a microprocessor. This module may also take the form of instructions to a synthetic or virtual processor or machine.

The apparatus that performs statistical object identification may be used in communications devices, security devices, network routing devices, application routing devices, service delivery devices and other devices that are enabled by the addition of the efficient communication of an original object through the reception of a statistical object which is identified as being generated from an original object.

VI. Examples

One specific, simplified example of the present invention is disclosed in this Section of the Specification. The following example offers a description of:
1. an original object 12S;
2. how that original object 12S is transformed into a statistical object 14S; and
3. how that statistical object 14S is identified as having been generated by the original object 12S.

The numbering convention that is used in this Specification, the Drawings, and the Claims to identify original and statistical objects is presented in Table One:

TABLE ONE

| | |
|---|---|
| 10 | Device (In this example, the Remote System) |
| 12M | Matched Original Object |
| 12P | Plurality of Original Objects |
| 12S | Original Object |
| 12SEL | Selected Original Object |
| 14A | Accumulated Statistical Object |
| 14AP | Plurality of Accumulated Statistical Objects |
| 14F | First Statistical Object |

TABLE ONE-continued

| 14NA | New Statistical Object |
|---|---|
| 14S | Statistical Object |

The letter "S" is used to signify a single object, while the letter "P" is used to signify a plurality. The reference character that refers to an original object always includes the numeral "12", while the numeral "14" is always used to refer to a statistical object.

For these examples, we will consider that an original object 12S is an X.509 certificate. An X.509 certificate is used to provide identity, and is digitally signed to prove its authenticity. For this example, the X.509 certificates are 1 KB in size (1024 bytes, 8192 bits). We need to communicate that we are using a specific X.509 certificate to a remote system that has a copy of each X.509 certificate that is expected to be used. Unfortunately, the system was designed before there was a requirement to communicate the X.509 certificates, and there is only enough space to communicate 32 bits worth of information, certainly not enough to send an entire X.509 certificate which is 256 times larger. But still needing to communicate the X.509 certificate, a cryptographic hash, 32 bits in length, is generated for each X.509 certificate and a common clock. The cryptographic hash is a statistical object 14S generated from an original object 12S. Now let us assume that we have 100 of these X.509 certificates, that is 100 original objects 12S. And let us assume that for each original object 12S, we generate a cryptographic hash of each X.509 certificate and a common clock to produce 100 statistical objects 14S each 32 bits in length. For descriptive purposes, three of these X.509 certificates and their corresponding statistical objects will be described. X.509 certificate #1 identifies Sally, and generates a statistical object 14S of value 22443. X.509 certificate #2 identifies Ben, and generates a statistical object 14S of value 32415. X.509 certificate #3 identifies Greg, and also generates a statistical object 14S of value 32415. The device 10 has generated the plurality of statistical objects 14P corresponding to the plurality of original objects 12P.

Now Ben needs to send a communication containing Ben's statistical object to device 10. Device 10 receives Ben's communication using a communications receiver 16. Although we, the narrator, knows that it was Ben that sent the communication to device 10, device 10 does not know this. Ben's communication includes Ben's statistical object (first statistical object 14F) and communications characteristics 22. In this case, the communications occurred over a TCP/IP network and the IP source and destination addresses and the TCP source and destination port numbers are used as communications characteristics 22. The source IP address is 1.1.1.2 and the destination IP address is 1.1.1.3. The source TCP port number is 2000 and the destination TCP port number is 3000. The communications receiver 16 sends the received communications characteristics 22 and Ben's statistical object 14F to the statistical object matcher 18. The statistical object matcher 18 compares Ben's statistical object 14F with the plurality of statistical objects 14P, and determines that there it matches two statistical objects, Ben's and Greg's. The statistical object matcher 18 sends Ben's statistical object 14F, the two matched statistical objects 14M (Ben's and Greg's) and the communications characteristics 22 to the accumulated statistical object selector 20. The accumulated statistical object selector 20 compares Ben's communications characteristics 22 with the plurality of accumulated statistical objects 14AP and finds no matches. Because no matches were found, the accumulated statistical object selector 20 creates a new accumulated statistical object 14A including Ben's statistical object 14F, the two matched statistical objects 14M and the communications characteristics 22. The new accumulated statistical object 14A is added to the plurality of accumulated statistical objects 14AP. The accumulated statistical object information is set to 32 bits to reflect the information contained in statistical object 14F. The accumulated statistical object 14AP is passed to the original object identifier 26. The original object identifier 26 determines that the accumulated statistical object 14AP does not unambiguously identify a single original object 12S. This concludes the operation of the device 10 for the reception of Ben's statistical object. The device 10 does not respond to Ben's communication because it cannot unambiguously determine who sent the communication.

Now Ben, who sent the original communication did not receive a response, so he sends another communication. Since time has passed since the first communication attempt, the clock value used to generate the statistical objects has changed. The new statistical objects and their corresponding X.509 certificates are: X.509 certificate #1 identifies Sally and generates a statistical object 14S of value 84256. X.509 certificate #2 identifies Ben and also generates a statistical object 14S of value 84256. X.509 certificate #3 identifies Greg and generates a statistical object 14S of value 10845. Due to time passing, device 10 regenerates the plurality of statistical objects 14P corresponding to the plurality of original objects 12P which match Sally, Ben and Greg.

Now Ben sends a second communication containing Ben's current statistical object to device 10. Device 10 receives Ben's communication using a communications receiver 16. Ben's communication includes Ben's statistical object 14F and communications characteristics 22. Again, the communications characteristic 22 is source IP address of 1.1.1.2, destination IP address of 1.1.1.3, source TCP port number of 2000 and destination TCP port number of 3000. The communications receiver 16 sends the received communications characteristics 22 and Ben's statistical object 14F to the statistical object matcher 18. The statistical object matcher 18 compares Ben's statistical object 14F with the plurality of statistical objects 14P and determines that there it matches two statistical objects, Ben's and Sally's. The statistical object matcher 18 sends Ben's statistical object 14F, the two matched statistical objects 14M (Ben's and Sally's) and the communications characteristics 22 to the accumulated statistical object selector 20. The accumulated statistical object selector 20 compares Ben's communications characteristics 22 with the plurality of accumulated statistical objects 14AP, and finds a match with Ben's previous communication. The matched accumulated statistical object 14A includes the previous matched statistical object 14M containing Ben and Greg and is compared against the two matched statistical objects 14M matching Ben's statistical object 14F containing Ben and Sally. The intersection of both matched statistical sets is Ben. Greg and Sally are removed from the accumulated statistical object 14A. The accumulated statistical object information increases from 32 bits to 64 bits with the addition of statistical object 14F. The accumulated statistical object 14A is passed to the original object identifier 26. The original object identifier 26 takes the given accumulated statistical object 14A and determines if the accumulated statistical information within the accumulated statistical object could only be generated by a single, unique original object 12S. Original object 12S is Ben's X.509 certificate. Original object 12S is now indicated as selected original object 12SEL, and is passed to the probability calculator 30. The probability calculator 30 takes the given accumulated statistical object 14A, and, based on the number of bits of statistical object information that has been accumulated in the accumulated statistical object 14A and the number of statistical objects in the plurality of statistical objects 14P, calculates the probability of guessing the accumulated statistical object information.

In this example, we have 100 statistical objects and have received 64 bits of statistical object information (32 bits×2). The probability of guessing is calculated by using the formula:

$$p(n;d) \approx 1 - e^{-n^2/(2 \times d)}$$

where n is the number of statistical objects in the table of valid statistical objects;
    d is the total number of unique statistical objects available; and
    d is $d=2^b$ where b is the number of bits of statistical object information received.
Therefore:

$$d=2^{64}, n=100 \text{ resulting in } p(100, 2^{64}) \approx 1 - e^{-100^2/(2 \times 2^{64})}, p(100, 2^{64}) \approx 0.$$

In this case, with only a few original objects (100) and a relatively large amount of accumulated statistical object information, the probability of guessing those 64 bits of accumulated statistical object information is vanishingly small, approaching zero. This calculated probability 36 and the accumulated statistical object 22 are passed to the threshold comparator 32. The threshold comparator 32 takes the calculated probability 36 and compares it with the probability threshold value 27. In our example, the probability threshold value 27 is 1 in a million. The threshold comparator 32 determines that our calculated probability 27 of zero is less than the probability threshold value of 1 in a million. Having not exceeded our probability threshold value 27, the threshold comparator 32 makes an indication 30 that includes the selected original object 12SEL Ben. This indication 30 communicates to other functions within the device 10 that the communication was send by Ben and has not exceeded the probability threshold value 27, and that the device 10 should now respond to Ben's communication.

In a second example, we continue with the first example but change the number of original objects 12S from 100 to 100,000,000 (one hundred million). The calculated probability 36 of guessing the accumulated statistical object 14A with 64 bits of information is 2.674%, greater than the probability threshold value of 1 in a million. Since this is greater than the threshold, this concludes the operation of the device 10 for the reception of Ben's statistical object. The device 10 does not respond to Ben's communication because it has exceeded the probability threshold value 27.

Now Ben, who sent the original communications again did not receive a response, so he sends another communication. Device 10 receives Ben's communication using a communications receiver 16. Ben's communication includes Ben's statistical object 14F and communications characteristics 22. Again, the communications characteristic 22 is source IP address of 1.1.1.2, destination IP address of 1.1.1.3, source TCP port number of 2000 and destination TCP port number of 3000. The communications receiver 16 sends the received communications characteristics 22 and Ben's statistical object 14F to the statistical object matcher 18. The statistical object matcher 18 compares Ben's statistical object 14F with the plurality of statistical objects 14P and determines that there it matches only a single statistical object, Ben's. The statistical object matcher 18 sends Ben's statistical object 14F, the matched statistical object 14M (Ben's) and the communications characteristics 22 to the accumulated statistical object selector 20. The accumulated statistical object selector 20 compares Ben's communications characteristics 22 with the plurality of accumulated statistical objects 14AP, and finds a match with Ben's previous communication. The matched accumulated statistical object 14A includes the previous matched statistical object 14M containing only Ben and is compared against the matched statistical object 14M matching Ben's statistical object 14F containing Ben. The intersection of both matched statistical sets is Ben. The accumulated statistical object information increases from 64 bits to 96 bits with the addition of statistical object 14F. The accumulated statistical object 14A is passed to the original object identifier 26. The original object identifier 26 takes the given accumulated statistical object 14A and determines if the accumulated statistical information within the accumulated statistical object could only be generated by a single, unique original object 12S. Original object 12S is Ben's X.509 certificate. Original object 12S is now indicated as selected original object 12SEL, and is passed to the probability calculator 30. The probability calculator 30 takes the given accumulated statistical object 22, and, based on the number of bits of statistical object information that has been accumulated in the accumulated statistical object 22 and the number of statistical objects in the plurality of statistical objects 14P, calculates the probability of guessing the accumulated statistical object information. In a second example, we continue with the first example but change the number of original objects 12S from 100 to 100,000,000 (one hundred million). The calculated probability 36 of guessing the accumulated statistical object 14A with 96 bits of information is again vanishingly small, approaching zero. This calculated probability 36 and the accumulated statistical object 22 are passed to the threshold comparator 32. The threshold comparator 32 takes the calculated probability 36 and compares it with the probability threshold value 27. The threshold comparator 32 determines that our calculated probability 27 of 0 is less than the probability threshold value of 1 in a million. Having not exceeded our probability threshold value 27, the threshold comparator 32 makes an indication 30 that includes the selected original object 12SEL Ben. This indication 30 communicates to other functions within the device 10 that the communication was send by Ben and has not exceeded the probability threshold value 27 and that the device 10 should now respond to Ben's communication.

In a third example, we continue with the second example and add an association of the selected original object 12SEL (Ben) and the communications characteristics 22. This allows for the optimization of subsequence communication requests from Ben.

Continuing with the third example, Ben makes another communication to device 10 during which within device 10 an association exists between Ben's original object and the communications characteristics 22 of Ben's previous communication. Device 10 receives Ben's communication using a communications receiver 16. Ben's communication includes Ben's statistical object (first statistical object 14F) and communications characteristics 22. This time, the communications characteristics 22 is source IP address of 1.1.1.2, destination IP address of 1.1.1.3, source TCP port number of 5000 and destination TCP port number of 7000. The source IP address is the same source IP address that was used in the prior, accepted communications. The statistical object matcher 18 compares Ben's statistical object 14F with the plurality of statistical objects 14P, and determines that there it matches two statistical objects, Ben's and Greg's. The statistical object matcher 18 sends Ben's statistical object 14F, the two matched statistical objects 14M (Ben's and Greg's) and the communications characteristics 22 to the accumulated statistical object selector 20 and sends the communications characteristics 22 to the associated original object selector 24. The accumulated statistical object selector 20 compares Ben's communications characteristics 22 with the plurality of accumulated statistical objects 14AP and finds no matches. Because no matches were found, the accumulated statistical object selector 20 creates a new accumulated statistical object 14A including Ben's statistical object 14F, the two matched statistical objects 14M and the communications characteristics 22. The new accumulated statistical object 14A is added to the plurality of accumulated statistical objects 14AP. The accumulated statistical object information is set to 32 bits to reflect the information contained in statistical object 14F. The accumulated statistical object selector 20 sends the accumulated statistical object 14A to the associated original object identifier 28.

The associated original object selector 24 receives the communications characteristics 22 and compares them with the communications characteristics 22 associated with the plurality of original objects 12P. Because an association exists between Ben's original object and Ben's communications characteristics 22, the associated original object selector 24 selects Ben's original object, indicated as 12SEL and passes the selected original object 12SEL to the associated original object identifier 28.

The associated original object identifier 28 takes the accumulated statistical object 14A and the selected original object 12SEL (Ben) and insures that the accumulated statistical object 14A could have been generated from the selected original object 12SEL. Upon determining that the accumulated statistical object 14A was producable by the selected original object 12SEL, the intersection of the original objects 14 is calculated using the original objects associated with the matched statistical objects 14M (Ben and Greg) and the selected original object 12SEL (Ben) resulting in Ben. This intersection is indicated in the accumulated statistical object 14A. Since there is exactly one original object now contained in the accumulated statistical object 14A, the accumulated statistical object 14A is sent to the probability calculator 30.

The probability calculator 30 takes the given accumulated statistical object 14A, and, based on the number of bits of statistical object information that has been accumulated in the accumulated statistical object 14A and the number of statistical objects in the plurality of statistical objects 14P, calculates the probability of guessing the accumulated statistical object information.

In this example, we have 100,000,000 statistical objects and have received 32 bits of statistical object information, but we have only a single statistical object that is associated with the Ben's communications characteristics 22. Therefore, instead of using 100,000,000 as the number of statistical objects, the number of statistical objects is 1, resulting in a calculated probability 36 of $p=\frac{1}{2}^{32}$. This calculated probability 36 and the accumulated statistical object 22 are passed to the threshold comparator 32. The threshold comparator 32 takes the calculated probability 36 and compares it with the probability threshold value 27. The threshold comparator 32 determines that our calculated probability 27 of $p=\frac{1}{2}^{32}$ is less than the probability threshold value of 1 in a million. Having not exceeded our probability threshold value 27, the threshold comparator 32 makes an indication 30 that includes the selected original object 12SEL Ben. This indication 30 communicates to other functions within the device 10 that the communication was send by Ben and has exceeded the probability threshold value 27 and that the device 10 should now respond to Ben's communication. It should be noted that in this third example, because we are using the communications characteristics 22 associated with the original object 12, we can arrive at an selected original object 12SEL and not exceed the probability threshold value 27 while receiving fewer bits of information from the received statistical object 14F.

CONCLUSION

Although the present invention has been described in detail with reference to one or more preferred embodiments, persons possessing ordinary skill in the art to which this invention pertains will appreciate that various modifications and enhancements may be made without departing from the spirit and scope of the claims that follow. The various alternatives for providing an efficient means for statistical object identity that have been disclosed above are intended to educate the reader about preferred embodiments of the invention, and are not intended to constrain the limits of the invention or the scope of Claims. The List of Reference Characters which follows is intended to provide the reader with a convenient means of identifying elements of the invention in the Specification and Drawings. This list is not intended to delineate or narrow the scope of the Claims.

LIST OF REFERENCE CHARACTERS

| LIST OF REFERENCE CHARACTERS | |
|---|---|
| 10 | Device (Remote System) |
| 12M | Matched Original Object |
| 12P | Plurality of Original Objects |
| 12S | Original Object |
| 12SEL | Selected Original Object |
| 14A | Accumulated Statistical Object |
| 14AP | Plurality of Accumulated Statistical Objects |
| 14F | First Statistical Object |
| 14M | Matching Statistical Object |
| 14MA | Matching Accumulated Statistical Object |
| 14MP | Plurality of Matching Statistical Objects |
| 14NA | New Accumulated Statistical Object |
| 14P | Plurality of Statistical Objects |
| 14S | Statistical Object |
| 16 | Communications Receiver |
| 18 | Statistical Object Matcher |
| 20 | Accumulated Statistical Object Selector |
| 22 | Communications Characteristics |
| 24 | Associated Original Object Selector |
| 26 | Original Object Identifier |
| 27 | Probability Threshold Value |
| 28 | Associated Original Object Identifier |

30 Probability Calculator
32 Threshold Comparator
34 Indication
36 Calculated Probability
(All components from 12M to 36 are included in device 10).

What is claimed is:
1. A method comprising the steps of:
providing a device (10) for generating a plurality of statistical objects (14P) based upon a plurality of original objects (12P);
each of said plurality of statistical objects (14P) being a statistical representation of one of said plurality of original objects (12P);
said plurality of original objects (12P) and said plurality of statistical objects (14P) being stored in a table;
using a communications receiver (32) to receive a first statistical object (14F) having communications characteristics (22);

using a statistical object matcher (18) to determine if said first statistical object (14F) matches at least one of said plurality of statistical objects (14P);

using an accumulated statistical object selector (20) to obtain and accumulate said first statistical object (14F) and a plurality of matched statistical objects (14MP) in an accumulated statistical object (14A) identified by said communications characteristics (22);

using an original object identifier (26) to determine if said accumulated statistical object (14A) can be produced by exactly one original object (12S) of said plurality of original objects (12P);

selecting that original object (12S) from said plurality of original objects (12P);

using a probability calculator (30) to determine a calculated probability (36) of guessing said accumulated statistical object (14A) based on said accumulated statistical object (14A) and the number of statistical objects in said plurality of said statistical objects (14P);

using a threshold comparator (32) to determine if said calculated probability (36) is less than a threshold value (27); and providing an indication (34) of said selected original object (12SEL).

2. A method as recited in claim 1, in which:
the probability of guessing said first statistical object (14F) remains constant, while the number of statistical objects in said plurality of statistical objects (14P) varies.

3. A method as recited in claim 1, in which:
the probability of guessing said accumulated statistical object (14A) remains constant, while the number of statistical objects in said plurality of statistical objects (14P) varies.

4. A method as recited in claim 1, in which:
said accumulated statistical object (14A) in said plurality of accumulated statistical objects (14AP) is removed after a period of inactivity pertaining to said accumulated statistical object (14A).

5. A method as recited in claim 1, in which:
said threshold value (27) can be changed without coordination with the source of said first statistical object (14F).

6. A method as recited in claim 1, in which:
said threshold value (27) can be changed without communication with the source of said first statistical object (14F).

7. A method as recited in claim 1, in which:
said threshold value (27) is associated with said selected original object (12SEL).

8. A method as recited in claim 1, in which:
said threshold value (27) is associated with said device (10).

9. A method as recited in claim 1, in which:
said threshold value (27) is associated with a plurality of original objects (12P).

10. A method as recited in claim 1, in which:
said indication (34) includes clock information used in the generation of said first statistical object (14F).

11. A method as recited in claim 1, in which:
said indication (34) includes keying information used in the generation of said first statistical object (14F).

12. A method as recited in claim 1, in which:
said indication (34) includes state information used in the generation of said first statistical object (14F).

13. A method as recited in claim 1, in which:
said indication (34) includes additional information used in the generation of said first statistical object (14F).

14. A method as recited in claim 1, in which:
said communications characteristics (22) includes TCP/IP session information.

15. A method as recited in claim 1, in which:
said communications characteristics (22) includes addressing information.

16. A method as recited in claim 1, in which:
said communications characteristics (22) includes security association information.

17. A method as recited in claim 1, in which:
said communications characteristics (22) includes frequency information.

18. A method as recited in claim 1, in which:
said communications characteristics (22) includes phase information.

19. A method as recited in claim 1, in which:
said communications characteristics (22) includes time information.

20. A method as recited in claim 1, in which:
said communications characteristics (22) includes amplitude information.

21. A method comprising the steps of:
providing a device (10) for generating a plurality of statistical objects (14P) based upon a plurality of original objects (12P);

each of said plurality of statistical objects (14P) being a statistical representation of one of said plurality of original objects (12P);

said plurality of original objects (12P) and said plurality of statistical objects (14P) being stored in a table;

receiving with a communications receiver (16) a first statistical object (14F) having communications characteristics (22);

determining with a statistical object matcher (18) if said first statistical object (14F) matches at least one of said plurality of statistical objects (14P);

obtaining and accumulating with an accumulated statistical object selector (20) said first statistical object (14F) and a plurality of matching statistical objects (14MP) in an accumulated statistical object (14A) identified by said communications characteristics (22);

selecting with an associated original object selector (24) a selected original object (12SEL) identified by said communications characteristics (22);

determining with associated original object identifier (28) if said accumulated statistical object (14A) can be produced by said selected original object (12SEL);

determining with a probability calculator (30) the calculated probability (36) of guessing said accumulated statistical object (14A) based on said accumulated statistical object (14A) and the number of statistical objects in said plurality of said statistical objects (14P) produced by original objects associated with said associated communications characteristics (22);

determining with a threshold comparator (32) if said calculated probability (36) is less than a probability threshold value (27);

associating said communications characteristics (22) with said selected original object (12SEL); and providing an indication (34) of said selected original object (12SEL).

22. A method as recited in claim 21, in which:
the probability of guessing said first statistical object (14F) remains constant while the number of statistical objects in said plurality of statistical objects (14P) varies.

23. A method as recited in claim 21, in which:
the probability of guessing said accumulated statistical object (14A) remains constant, while the number of statistical objects in said plurality of statistical objects (14P) varies.

24. A method as recited in claim 21, in which:
said accumulated statistical object (14A) in said plurality of accumulated statistical objects (14A) is removed after a period of inactivity pertaining to said accumulated statistical object (14A).

25. A method as recited in claim 21, in which:
said association of communications characteristics (22) with said original object (12S) is removed after a period of inactivity pertaining to said communications criteria (22).

26. A method as recited in claim 21, in which:
said association of communications criteria (22) with said original object (12S) is removed after a period of inactivity pertaining to said original object (12S).

27. A method as recited in claim 21, in which:
said association of communications criteria (22) with said original object (12S) is created prior to receiving a first statistical object (14F).

28. A method as recited in claim 21, in which:
said probability threshold value (27) can be changed without coordination with the source of said first statistical object (14F).

29. A method as recited in claim 21, in which:
said probability threshold value (27) can be changed without communication with the source of said first statistical object (14F).

30. A method as recited in claim 21, in which:
said probability threshold value (27) is associated with said selected original object (26).

31. A method as recited in claim 21, in which:
said probability threshold value (27) is associated with said device (10).

32. A method as recited in claim 21, in which:
said probability threshold value (27) is associated with a plurality of original objects.

33. A method as recited in claim 21, in which:
said indication (34) includes clock information used in the generation of said first statistical object (14F).

34. A method as recited in claim 21, in which:
said indication (34) includes keying information used in the generation of said first statistical object (14F).

35. A method as recited in claim 21, in which:
said indication (34) includes state information used in the generation of said first statistical object (14F).

36. A method as recited in claim 21, in which:
said indication (34) includes additional information used in the generation of said first statistical object (14F).

37. A method as recited in claim 21, in which:
said communications characteristics (22) includes TCP/IP session information.

38. A method as recited in claim 21, in which:
said communications characteristics (22) includes addressing information.

39. A method as recited in claim 21, in which:
said communications characteristics (22) includes security association information.

40. A method as recited in claim 21, in which:
said communications characteristics (22) includes frequency information.

41. A method as recited in claim 21, in which:
said communications characteristics (22) includes phase information.

42. A method as recited in claim 21, in which:
said communications characteristics (22) includes time information.

43. A method as recited in claim 21, in which:
said communications characteristics (22) includes amplitude information.

* * * * *